(12) United States Patent
Baek et al.

(10) Patent No.: US 12,262,416 B2
(45) Date of Patent: Mar. 25, 2025

(54) RESTRICTED TARGET WAKE TIME-BASED METHOD AND APPARATUS FOR COMMUNICATING IN WIRELESS LAN SYSTEM

(71) Applicant: LG ELECTRONICS INC., Seoul (KR)

(72) Inventors: Sunhee Baek, Seoul (KR); Insun Jang, Seoul (KR); Jinsoo Choi, Seoul (KR); Jiin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/680,954

(22) Filed: May 31, 2024

(65) Prior Publication Data
US 2024/0324014 A1    Sep. 26, 2024

Related U.S. Application Data

(63) Continuation of application No. PCT/KR2023/003186, filed on Mar. 8, 2023.

(30) Foreign Application Priority Data

Mar. 8, 2022 (KR) .................. 10-2022-0029623
Mar. 16, 2022 (KR) .................. 10-2022-0032850

(51) Int. Cl.
*H04W 74/0816* (2024.01)
*H04W 74/08* (2024.01)
*H04W 84/12* (2009.01)

(52) U.S. Cl.
CPC ... *H04W 74/0816* (2013.01); *H04W 74/0866* (2013.01); *H04W 84/12* (2013.01)

(58) Field of Classification Search
CPC ......... H04W 74/0816; H04W 74/0866; H04W 84/12
See application file for complete search history.

(56) References Cited

U.S. PATENT DOCUMENTS

2021/0329500 A1* 10/2021 Cariou ............... H04W 74/002
2021/0360646 A1   11/2021 Chu et al.
2022/0070772 A1   3/2022 Ho et al.

OTHER PUBLICATIONS

PCT International Application No. PCT/KR2023/003186, International Search Report dated Jun. 5, 2023, 3 pages.

(Continued)

*Primary Examiner* — Mohammad S Anwar
(74) *Attorney, Agent, or Firm* — LEE, HONG, DEGERMAN, KANG & WAIMEY

(57) ABSTRACT

A method and apparatus for communicating in a wireless LAN system are disclosed. The method by which a first station (STA) communicates in a wireless LAN system comprises the steps of: performing, with a second STA, a restricted target wake time (r-TWT) membership setup procedure; and receiving, from the second STA, r-TWT schedule information included in a broadcast TWT element, wherein, on the basis that a specific portion of a first transmission opportunity (TX-OP) in a r-TWT service period (SP) notified by the r-TWT schedule information is not used for downlink (DL) frame transmission corresponding to at least one r-TWT DL traffic identifier (TID) or uplink (UL) frame request corresponding to at least one r-TWT UL TID, the first TXOP may be terminated before the start time of the r-TWT SP.

6 Claims, 25 Drawing Sheets

(56) References Cited

OTHER PUBLICATIONS

Baek et al., "TGbe D0.3 Comment Resolutions for Restricted TWT SP," IEEE 802.11-21/0672r2, Jul. 2021, 5 pages.
Shafin et al., "Resolution for CIDs related to Restricted TWT Schedule Announcement," IEEE 802.11-21/1768r7, Feb. 2022, 4 pages.
Korean Intellectual Property Office Application No. 10-2024-7017179, Office Action dated Sep. 23, 2024, 5 pages.
Guo, et al., "CR for rTWT TXOP rules," IEEE 802.11-22/0139r0, Jan. 2022, 4 pages.

* cited by examiner

RESTRICTED TARGET WAKE TIME-BASED METHOD AND APPARATUS FOR COMMUNICATING IN WIRELESS LAN SYSTEM

CROSS-REFERENCE TO RELATED APPLICATIONS

This application is a continuation of International Application No. PCT/KR2023/003186, filed on Mar. 8, 2023, which claims the benefit of earlier filing date and right of priority to Korean Application Nos. 10-2022-0029623, filed on Mar. 8, 2022, and 10-2022-0032850, filed on Mar. 16, 2022, the contents of which are all hereby incorporated by reference herein in their entireties.

TECHNICAL FIELD

The present disclosure relates to a method and device for performing communication in a wireless local area network (WLAN) system, and more specifically, relates to a method and device for performing communication based on restricted target wake time (TWT) in a next-generation wireless LAN system.

BACKGROUND ART

New technologies for improving transmission rates, increasing bandwidth, improving reliability, reducing errors, and reducing latency have been introduced for a wireless LAN (WLAN). Among WLAN technologies, an Institute of Electrical and Electronics Engineers (IEEE) 802.11 series standard may be referred to as Wi-Fi. For example, technologies recently introduced to WLAN include enhancements for Very High-Throughput (VHT) of the 802.11ac standard, and enhancements for High Efficiency (HE) of the IEEE 802.11ax standard.

In order to provide a more improved wireless communication environment, an enhancement technologies for EHT (Extremely High Throughput) are being discussed. For example, technologies for multiple access point (AP) coordination and multiple input multiple output (MIMO) supporting an increased bandwidth, efficient utilization of multiple bands and increased spatial streams are being studied, and, in particular, various technologies for supporting low latency or real-time traffic are being studied.

SUMMARY

The technical problem of the present disclosure is to provide a method and device for transmitting latency sensitive data/traffic in a wireless LAN system.

An additional technical problem of the present disclosure is to provide a method and device for executing a conditional r-TWT SP (service period) TXOP rule in a wireless LAN system.

The technical objects to be achieved by the present disclosure are not limited to the above-described technical objects, and other technical objects which are not described herein will be clearly understood by those skilled in the pertinent art from the following description.

A method of performing communication by a first station (STA) in a wireless LAN system according to an aspect of the present disclosure may include performing a restricted target wake time (r-TWT) membership setup procedure with a second STA; and receiving r-TWT schedule information included in a broadcast TWT element from the second STA, and based on a specific portion of a first transmission opportunity (TXOP) within the r-TWT service period (SP) announced by the r-TWT schedule information being not used to deliver a downlink (DL) frame corresponding to at least one r-TWT DL TID or to solicit a uplink (UL) frame corresponding to at least one r-TWT UL traffic identifier (TID), the first TXOP ends before a start time of the r-TWT SP.

A method of performing communication by a second station (STA) in a wireless LAN system according to an aspect of the present disclosure may include performing a restricted target wake time (r-TWT) membership setup procedure with a first STA; and transmitting r-TWT schedule information included in a broadcast TWT element to the first STA, and based on a specific portion of a first transmission opportunity (TXOP) within the r-TWT service period (SP) announced by the r-TWT schedule information being not used to deliver a downlink (DL) frame corresponding to at least one r-TWT DL TID or to solicit a uplink (UL) frame corresponding to at least one r-TWT UL traffic identifier (TID), the first TXOP ends before a start time of the r-TWT SP.

According to the present disclosure, a method and apparatus for transmitting latency-sensitive data/traffic in a wireless LAN system may be provided.

According to the present disclosure, a method and apparatus for executing a conditional r-TWT SP (service period) TXOP rule in a wireless LAN system may be provided.

According to the present disclosure, it is possible to improve the efficiency of delay-sensitive data/traffic transmission in a way that does not interfere with existing data transmission and reception flows, as well as the predictable low-delay service targeted by the TXOP rule of r-TWT SP.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
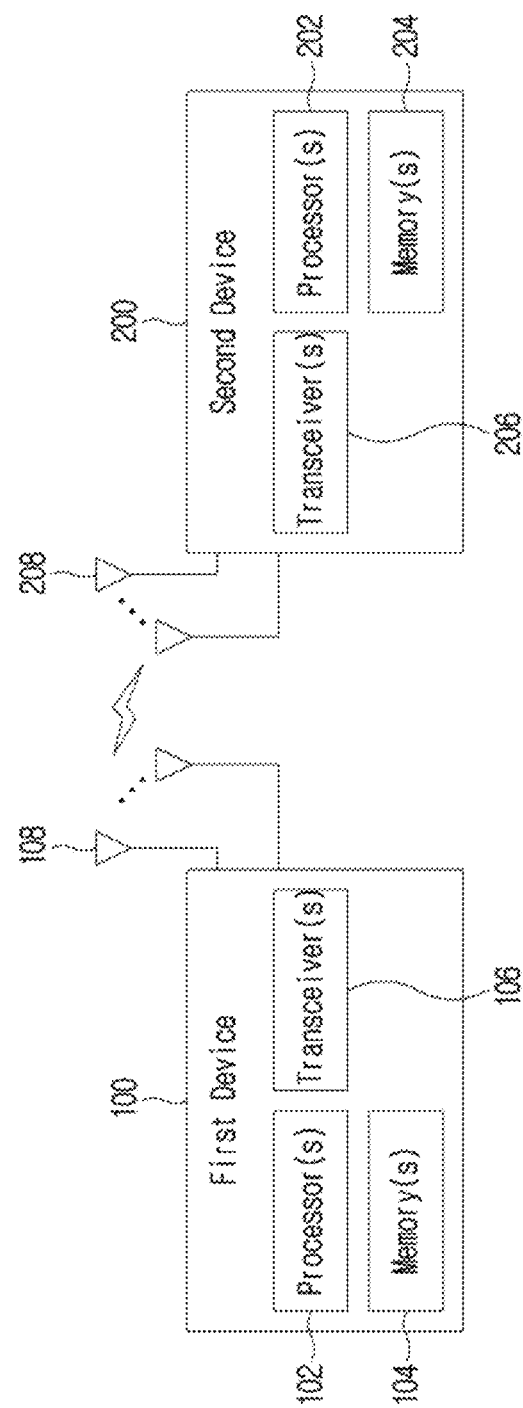
FIG. 1 illustrates a block configuration diagram of a wireless communication device according to an embodiment of the present disclosure.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

Examples of the present disclosure may be applied to various wireless communication systems. For example, examples of the present disclosure may be applied to a wireless LAN system. For example, examples of the present disclosure may be applied to an IEEE 802.11a/g/n/ac/ax standards-based wireless LAN. Furthermore, examples of the present disclosure may be applied to a wireless LAN based on the newly proposed IEEE 802.11be (or EHT) standard. Examples of the present disclosure may be applied to an IEEE 802.11be Release-2 standard-based wireless LAN corresponding to an additional enhancement technology of the IEEE 802.11be Release-1 standard. Additionally, examples of the present disclosure may be applied to a next-generation standards-based wireless LAN after IEEE 802.11be. Further, examples of this disclosure may be applied to a cellular wireless communication system. For example, it may be applied to a cellular wireless communication system based on Long Term Evolution (LTE)-based technology and 5G New Radio (NR)-based technology of the 3rd Generation Partnership Project (3GPP) standard.

Hereinafter, technical features to which examples of the present disclosure may be applied will be described.

FIG. 1 illustrates a block diagram of a wireless communication device according to an embodiment of the present disclosure.

The first device 100 and the second device 200 illustrated in FIG. 1 may be replaced with various terms such as a terminal, a wireless device, a Wireless Transmit Receive Unit (WTRU), an User Equipment (UE), a Mobile Station (MS), an user terminal (UT), a Mobile Subscriber Station (MSS), a Mobile Subscriber Unit (MSU), a subscriber station (SS), an advanced mobile station (AMS), a wireless terminal (WT), or simply user, etc. In addition, the first device 100 and the second device 200 include an access point (AP), a base station (BS), a fixed station, a Node B, a base transceiver system (BTS), a network, It may be replaced with various terms such as an Artificial Intelligence (AI) system, a road side unit (RSU), a repeater, a router, a relay, and a gateway.

The devices 100 and 200 illustrated in FIG. 1 may be referred to as stations (STAs). For example, the devices 100 and 200 illustrated in FIG. 1 may be referred to by various terms such as a transmitting device, a receiving device, a transmitting STA, and a receiving STA. For example, the STAs 110 and 200 may perform an access point (AP) role or a non-AP role. That is, in the present disclosure, the STAs 110 and 200 may perform functions of an AP and/or a non-AP. When the STAs 110 and 200 perform an AP function, they may be simply referred to as APs, and when the STAs 110 and 200 perform non-AP functions, they may be simply referred to as STAs. In addition, in the present disclosure, an AP may also be indicated as an AP STA.

Referring to FIG. 1, the first device 100 and the second device 200 may transmit and receive radio signals through various wireless LAN technologies (e.g., IEEE 802.11 series). The first device 100 and the second device 200 may include an interface for a medium access control (MAC) layer and a physical layer (PHY) conforming to the IEEE 802.11 standard.

In addition, the first device 100 and the second device 200 may additionally support various communication standards (e.g., 3GPP LTE series, 5G NR series standards, etc.) technologies other than wireless LAN technology. In addition, the device of the present disclosure may be implemented in various devices such as a mobile phone, a vehicle, a personal computer, augmented reality (AR) equipment, and virtual reality (VR) equipment, etc. In addition, the STA of the present specification may support various communication services such as a voice call, a video call, data communication, autonomous-driving, machine-type communication (MTC), machine-to-machine (M2M), device-to-device (D2D), IoT (Internet-of-Things), etc.

A first device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including instructions for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless LAN technology (e.g., IEEE 802.11 series). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a device may mean a communication modem/circuit/chip.

A second device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including instructions for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless LAN technology (e.g., IEEE 802.11 series). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a device may mean a communication modem/circuit/chip.

Hereinafter, a hardware element of a device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC). One or more processors 102, 202 may generate one or more PDUs (Protocol Data Unit) and/or one or more SDUs (Service Data Unit) according to description, functions, procedures, proposals, methods and/or operation flow charts disclosed in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs(Application Specific Integrated Circuit), one or more DSPs(Digital Signal Processor), one or more DSPDs (Digital Signal Processing Device), one or more PLDs(Programmable Logic Device) or one or more FPGAs(Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, an instruction and/or a set of instructions.

One or more memories 104, 204 may be connected to one or more processors 102, 202 and may store data, a signal, a message, information, a program, a code, an indication and/or an instruction in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

For example, one of the STAs 100 and 200 may perform an intended operation of an AP, and the other of the STAs 100 and 200 may perform an intended operation of a non-AP STA. For example, the transceivers 106 and 206 of FIG. 1 may perform a transmission and reception operation of a signal (e.g., a packet or a physical layer protocol data unit (PPDU) conforming to IEEE 802.11a/b/g/n/ac/ax/be). In addition, in the present disclosure, an operation in which various STAs generate transmission/reception signals or perform data processing or calculation in advance for transmission/reception signals may be performed by the processors 102 and 202 of FIG. 1. For example, an example of an operation of generating a transmission/reception signal or performing data processing or calculation in advance for the transmission/reception signal may include 1) determining/acquiring/configuring/calculating/decoding/encoding bit information of fields (signal (SIG), short training field (STF), long training field (LTF), Data, etc.) included in the PPDU, 2) determining/configuring/acquiring time resources or frequency resources (e.g., subcarrier resources) used for fields (SIG, STF, LTF, Data, etc.) included in the PPDU; 3) determining/configuring/acquiring a specific sequence (e.g., pilot sequence, STF/LTF sequence, extra sequence applied to SIG) used for fields (SIG, STF, LTF, Data, etc.) included in the PPDU action, 4) power control operation and/or power saving operation applied to the STA, 5) Operations related to ACK signal determination/acquisition/configuration/calculation/decoding/encoding, etc. In addition, in the following example, various information (e.g., information related to fields/subfields/control fields/parameters/power, etc.) used by various STAs to determine/acquire/configure/calculate/decode/encode transmission and reception signals may be stored in the memories 104 and 204 of FIG. 1.

Hereinafter, downlink (DL) may mean a link for communication from an AP STA to a non-AP STA, and a DL PPDU/packet/signal may be transmitted and received through the DL. In DL communication, a transmitter may be part of an AP STA, and a receiver may be part of a non-AP STA. Uplink (UL) may mean a link for communication from non-AP STAs to AP STAs, and a UL PPDU/packet/signal may be transmitted and received through the UL. In UL communication, a transmitter may be part of a non-AP STA, and a receiver may be part of an AP STA.

Figure 2:
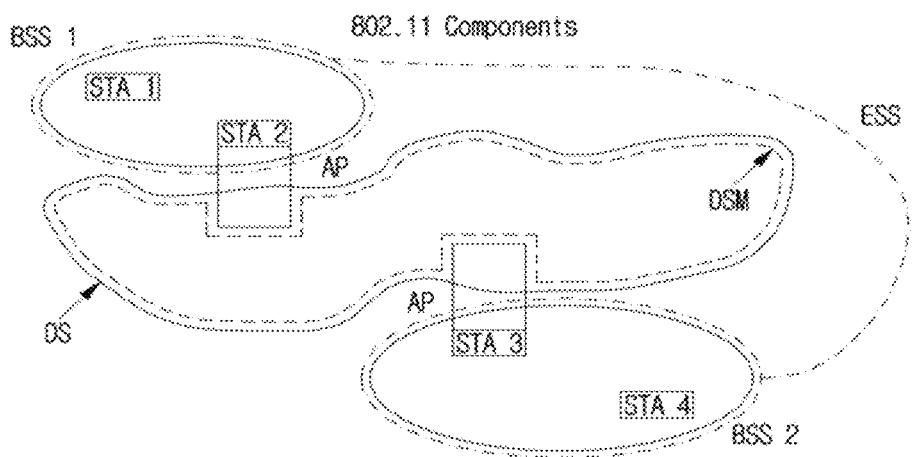
FIG. 2 is a diagram illustrating an exemplary structure of a WLAN system to which the present disclosure may be applied.

FIG. 2 is a diagram illustrating an exemplary structure of a wireless LAN system to which the present disclosure may be applied.

The structure of the wireless LAN system may consist of be composed of a plurality of components. A wireless LAN supporting STA mobility transparent to an upper layer may be provided by interaction of a plurality of components. A Basic Service Set (BSS) corresponds to a basic construction block of a wireless LAN. FIG. 2 exemplarily shows that two BSSs (BSS1 and BSS2) exist and two STAs are included as members of each BSS (STA1 and STA2 are included in BSS1, and STA3 and STA4 are included in BSS2). An ellipse representing a BSS in FIG. 2 may also be understood as representing a coverage area in which STAs included in the corresponding BSS maintain communication. This area may be referred to as a Basic Service Area (BSA). When an STA moves out of the BSA, it may not directly communicate with other STAs within the BSA.

If the DS shown in FIG. 2 is not considered, the most basic type of BSS in a wireless LAN is an independent BSS (IBSS). For example, IBSS may have a minimal form containing only two STAs. For example, assuming that other components are omitted, BSS1 containing only STA1 and STA2 or BSS2 containing only STA3 and STA4 may respectively correspond to representative examples of IBSS. This configuration is possible when STAs may communicate directly without an AP. In addition, in this type of wireless LAN, it is not configured in advance, but may be configured when a LAN is required, and this may be referred to as an ad-hoc network. Since the IBSS does not include an AP, there is no centralized management entity. That is, in IBSS, STAs are managed in a distributed manner. In IBSS, all STAs may be made up of mobile STAs, and access to the distributed system (DS) is not allowed, forming a self-contained network.

Membership of an STA in the BSS may be dynamically changed by turning on or off the STA, entering or exiting the BSS area, and the like. To become a member of the BSS, the STA may join the BSS using a synchronization process. In order to access all services of the BSS infrastructure, the STA shall be associated with the BSS. This association may be dynamically established and may include the use of a Distribution System Service (DSS).

A direct STA-to-STA distance in a wireless LAN may be limited by PHY performance. In some cases, this distance limit may be sufficient, but in some cases, communication between STAs at a longer distance may be required. A distributed system (DS) may be configured to support extended coverage.

DS means a structure in which BSSs are interconnected. Specifically, as shown in FIG. 2, a BSS may exist as an extended form of a network composed of a plurality of BSSs. DS is a logical concept and may be specified by the characteristics of Distributed System Media (DSM). In this regard, a wireless medium (WM) and a DSM may be logically separated. Each logical medium is used for a different purpose and is used by different components. These medium are not limited to being the same, nor are they limited to being different. In this way, the flexibility of the wireless LAN structure (DS structure or other network structure) may be explained in that a plurality of media are logically different. That is, the wireless LAN structure may be implemented in various ways, and the corresponding wireless LAN structure may be independently specified by the physical characteristics of each embodiment.

A DS may support a mobile device by providing seamless integration of a plurality of BSSs and providing logical services necessary to address an address to a destination. In addition, the DS may further include a component called a portal that serves as a bridge for connection between the wireless LAN and other networks (e.g., IEEE 802.X).

The AP enables access to the DS through the WM for the associated non-AP STAs, and means an entity that also has the functionality of an STA. Data movement between the BSS and the DS may be performed through the AP. For example, STA2 and STA3 shown in FIG. 2 have the functionality of STAs, and provide a function allowing the associated non-AP STAs (STA1 and STA4) to access the DS. In addition, since all APs basically correspond to STAs, all APs are addressable entities. The address used by the AP for communication on the WM and the address used by the AP for communication on the DSM are not necessarily the same. A BSS composed of an AP and one or more STAs may be referred to as an infrastructure BSS.

Data transmitted from one of the STA(s) associated with an AP to a STA address of the corresponding AP may be always received on an uncontrolled port and may be processed by an IEEE 802.1X port access entity. In addition, when a controlled port is authenticated, transmission data (or frames) may be delivered to the DS.

In addition to the structure of the DS described above, an extended service set (ESS) may be configured to provide wide coverage.

An ESS means a network in which a network having an arbitrary size and complexity is composed of DSs and BSSs. The ESS may correspond to a set of BSSs connected to one DS. However, the ESS does not include the DS. An ESS network is characterized by being seen as an IBSS in the Logical Link Control (LLC) layer. STAs included in the ESS may communicate with each other, and mobile STAs may move from one BSS to another BSS (within the same ESS) transparently to the LLC. APs included in one ESS may have the same service set identification (SSID). The SSID is distinguished from the BSSID, which is an identifier of the BSS.

The wireless LAN system does not assume anything about the relative physical locations of BSSs, and all of the following forms are possible. BSSs may partially overlap, which is a form commonly used to provide continuous coverage. In addition, BSSs may not be physically connected, and logically there is no limit on the distance between BSSs. In addition, the BSSs may be physically located in the same location, which may be used to provide redundancy. In addition, one (or more than one) IBSS or ESS networks may physically exist in the same space as one (or more than one) ESS network. When an ad-hoc network operates in a location where an ESS network exists, when physically overlapping wireless networks are configured by different organizations, or when two or more different access and security policies are required in the same location, this may correspond to the form of an ESS network in the like.

Figure 3:
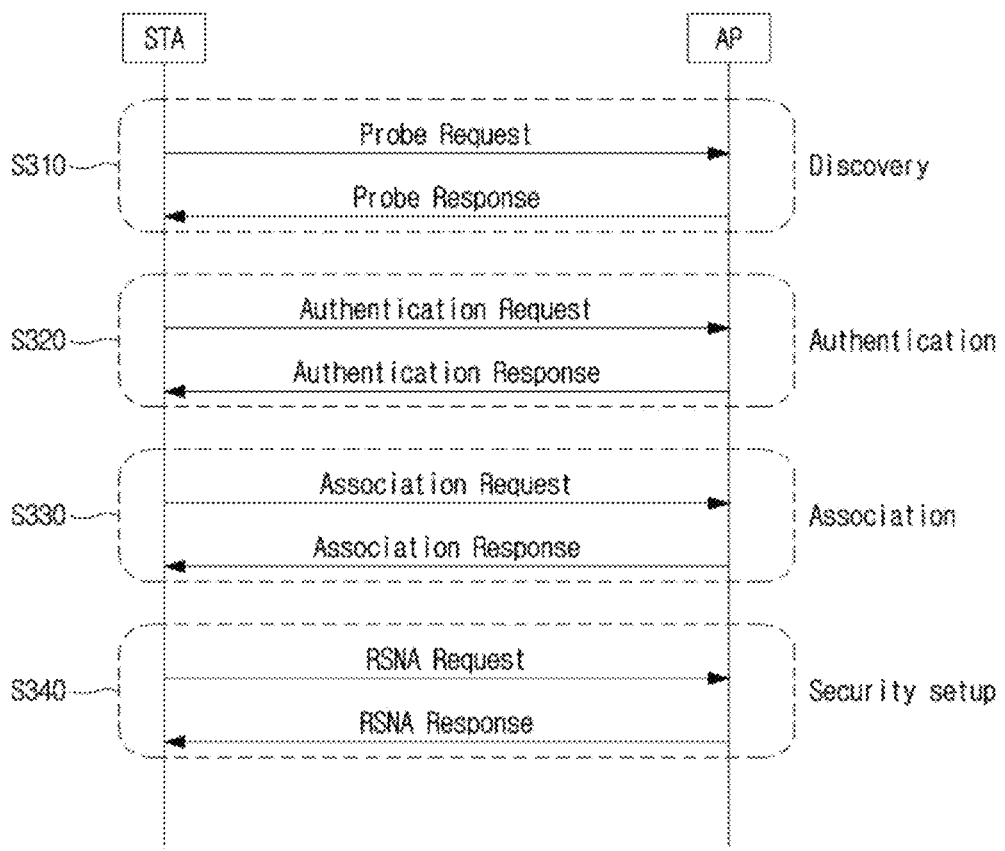
FIG. 3 is a diagram for describing a link setup process to which the present disclosure may be applied.

FIG. 3 is a diagram for explaining a link setup process to which the present disclosure may be applied.

In order for an STA to set up a link with respect to a network and transmit/receive data, it first discovers a network, performs authentication, establishes an association, and need to perform the authentication process for security. The link setup process may also be referred to as a session initiation process or a session setup process. In addition, the processes of discovery, authentication, association, and security setting of the link setup process may be collectively referred to as an association process.

In step S310, the STA may perform a network discovery operation. The network discovery operation may include a scanning operation of the STA. That is, in order for the STA to access the network, it needs to find a network in which it can participate. The STA shall identify a compatible network before participating in a wireless network, and the process of identifying a network existing in a specific area is called scanning.

Scanning schemes include active scanning and passive scanning. FIG. 3 exemplarily illustrates a network discovery operation including an active scanning process. In active scanning, an STA performing scanning transmits a probe request frame to discover which APs exist around it while moving channels and waits for a response thereto. A responder transmits a probe response frame as a response to the probe request frame to the STA that has transmitted the probe request frame. Here, the responder may be an STA that last transmitted a beacon frame in the BSS of the channel being scanned. In the BSS, since the AP transmits the beacon frame, the AP becomes a responder, and in the IBSS, the STAs in the IBSS rotate to transmit the beacon frame, so the responder is not constant. For example, a STA that transmits a probe request frame on channel 1 and receives a probe response frame on channel 1, may store BSS-related information included in the received probe response frame and may move to the next channel (e.g., channel 2) and perform scanning (i.e., transmission/reception of a probe request/response on channel 2) in the same manner.

Although not shown in FIG. 3, the scanning operation may be performed in a passive scanning manner. In passive scanning, a STA performing scanning waits for a beacon frame while moving channels. The beacon frame is one of the management frames defined in IEEE 802.11, and is periodically transmitted to notify the existence of a wireless network and to allow the STA performing scanning to find a wireless network and participate in the wireless network. In the BSS, the AP serves to transmit beacon frames periodically, and in the IBSS, STAs within the IBSS rotate to transmit beacon frames. When the STA performing scanning receives a beacon frame, the STA stores information for the BSS included in the beacon frame and records beacon frame information in each channel while moving to another channel. The STA receiving the beacon frame may store BSS-related information included in the received beacon frame, move to the next channel, and perform scanning in the next channel in the same way. Comparing active scanning and passive scanning, active scanning has an advantage of having less delay and less power consumption than passive scanning.

After the STA discovers the network, an authentication process may be performed in step S320. This authentication process may be referred to as a first authentication process in order to be clearly distinguished from the security setup operation of step S340 to be described later.

The authentication process includes a process in which the STA transmits an authentication request frame to the AP, and in response to this, the AP transmits an authentication response frame to the STA. An authentication frame used for authentication request/response corresponds to a management frame.

The authentication frame includes an authentication algorithm number, an authentication transaction sequence number, a status code, a challenge text, a robust security network (RSN), and a Finite Cyclic Group, etc. This corresponds to some examples of information that may be included in the authentication request/response frame, and may be replaced with other information or additional information may be further included.

The STA may transmit an authentication request frame to the AP. The AP may determine whether to allow authentication of the corresponding STA based on information included in the received authentication request frame. The AP may provide the result of the authentication process to the STA through an authentication response frame.

After the STA is successfully authenticated, an association process may be performed in step S330. The association process includes a process in which the STA transmits an association request frame to the AP, and in response, the AP transmits an association response frame to the STA.

For example, the association request frame may include information related to various capabilities, a beacon listen interval, a service set identifier (SSID), supported rates, supported channels, RSN, mobility domain, supported operating classes, Traffic Indication Map Broadcast request (TIM broadcast request), interworking service capability, etc. For example, the association response frame may include information related to various capabilities, status code, association ID (AID), supported rates, enhanced distributed channel access (EDCA) parameter set, received channel power indicator (RCPI), received signal to noise indicator (RSNI), mobility domain, timeout interval (e.g., association comeback time), overlapping BSS scan parameters, TIM broadcast response, Quality of Service (QOS) map, etc. This corresponds to some examples of information that may be included in the association request/response frame, and may be replaced with other information or additional information may be further included.

After the STA is successfully associated with the network, a security setup process may be performed in step S340. The security setup process of step S340 may be referred to as an authentication process through Robust Security Network Association (RSNA) request/response, and the authentication process of step S320 is referred to as a first authentication process, and the security setup process of step S340 may also simply be referred to as an authentication process.

The security setup process of step S340 may include, for example, a process of setting up a private key through 4-way handshaking through an Extensible Authentication Protocol over LAN (EAPOL) frame. In addition, the security setup process may be performed according to a security scheme not defined in the IEEE 802.11 standard.

Figure 4:
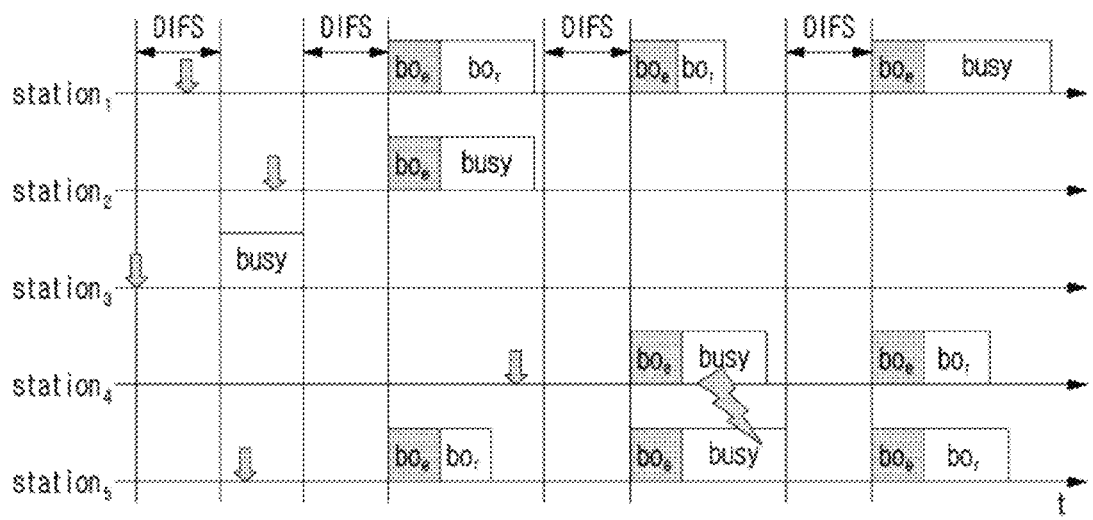
FIG. 4 is a diagram for describing a backoff process to which the present disclosure may be applied.

FIG. 4 is a diagram for explaining a backoff process to which the present disclosure may be applied.

In the wireless LAN system, a basic access mechanism of medium access control (MAC) is a carrier sense multiple access with collision avoidance (CSMA/CA) mechanism. The CSMA/CA mechanism is also called Distributed Coordination Function (DCF) of IEEE 802.11 MAC, and basically adopts a "listen before talk" access mechanism. According to this type of access mechanism, the AP and/or STA may perform Clear Channel Assessment (CCA) sensing a radio channel or medium during a predetermined time interval (e.g., DCF Inter-Frame Space (DIFS)), prior to starting transmission. As a result of the sensing, if it is determined that the medium is in an idle state, frame transmission is started through the corresponding medium. On the other hand, if it is detected that the medium is occupied or busy, the corresponding AP and/or STA does not start its own transmission and may set a delay period for medium access (e.g., a random backoff period) and attempt frame transmission after waiting. By applying the random backoff period, since it is expected that several STAs attempt frame transmission after waiting for different periods of time, collision may be minimized.

In addition, the IEEE 802.11 MAC protocol provides a Hybrid Coordination Function (HCF). HCF is based on the DCF and Point Coordination Function (PCF). PCF is a polling-based synchronous access method and refers to a method in which all receiving APs and/or STAs periodically poll to receive data frames. In addition, HCF has Enhanced Distributed Channel Access (EDCA) and HCF Controlled Channel Access (HCCA). EDCA is a contention-based access method for a provider to provide data frames to multiple users, and HCCA uses a non-contention-based channel access method using a polling mechanism. In addition, the HCF includes a medium access mechanism for improving QoS (Quality of Service) of the wireless LAN, and may transmit QoS data in both a Contention Period (CP) and a Contention Free Period (CFP).

Referring to FIG. 4, an operation based on a random backoff period will be described. When the occupied/busy medium changes to an idle state, several STAs may attempt to transmit data (or frames). As a method for minimizing collisions, each of STAs may respectively select a random backoff count and attempt transmission after waiting for a corresponding slot time. The random backoff count has a pseudo-random integer value and may be determined as one of values ranging from 0 to CW. Here, CW is a contention window parameter value. The CW parameter is given CWmin as an initial value, but may take a value twice as large in case of transmission failure (e.g., when an ACK for the transmitted frame is not received). When the CW parameter value reaches CWmax, data transmission may be attempted while maintaining the CWmax value until data transmission is successful, and when data transmission is successful, the CWmin value is reset. The values of CW, CWmin and CWmax are preferably set to $2^n-1$ (n=0, 1, 2, . . . ).

When the random backoff process starts, the STA continuously monitors the medium while counting down the backoff slots according to the determined backoff count value. When the medium is monitored for occupancy, it stops counting down and waits, and resumes the rest of the countdown when the medium becomes idle.

In the example of FIG. 4, when a packet to be transmitted arrives at the MAC of STA3, STA3 may transmit the frame immediately after confirming that the medium is idle as much as DIFS. The remaining STAs monitor and wait for the medium to be occupied/busy. In the meantime, data to be transmitted may also occur in each of STA1, STA2, and STA5, and each STA waits as long as DIFS when the medium is monitored as idle, and then may perform a countdown of the backoff slot according to the random backoff count value selected by each STA. Assume that STA2 selects the smallest backoff count value and STA1 selects the largest backoff count value. That is, the case where the remaining back-off time of STA5 is shorter than the remaining back-off time of STA1 at the time when STA2 completes the back-off count and starts frame transmission is exemplified. STA1 and STA5 temporarily stop counting down and wait while STA2 occupies the medium. When the occupation of STA2 ends and the medium becomes idle again, STA1 and STA5 wait for DIFS and resume the stopped backoff count. That is, frame transmission may be started after counting down the remaining backoff slots for the remaining backoff time. Since the remaining backoff time of STA5 is shorter than that of STA1, STA5 starts frame transmission. While STA2 occupies the medium, data to be transmitted may also occur in STA4. From the standpoint of STA4, when the medium becomes idle, STA4 may wait for DIFS, and then may perform a countdown according to the random backoff count value selected by the STA4 and start transmitting frames. The example of FIG. 4 shows a case where the remaining backoff time of STA5 coincides with the random backoff count value of STA4 by chance. In this case, a collision may occur between STA4 and STA5. When a collision occurs, both STA4 and STA5 do not receive an ACK, so data transmission fails. In this case, STA4 and STA5 may double the CW value, select a random backoff count value, and perform a countdown. STA1 waits while the medium is occupied due to transmission of STA4 and STA5, waits for DIFS when the medium becomes idle, and then starts frame transmission after the remaining backoff time has elapsed.

As in the example of FIG. 4, the data frame is a frame used for transmission of data forwarded to a higher layer, and may be transmitted after a backoff performed after DIFS elapses from when the medium becomes idle. Additionally, the management frame is a frame used for exchange of management information that is not forwarded to a higher layer, and is transmitted after a backoff performed after an IFS such as DIFS or Point Coordination Function IFS (PIFS). As a subtype frames of management frame, there are a Beacon, an association request/response, a re-association request/response, a probe request/response, an authentication request/response, etc. A control frame is a frame used to control access to a medium. As a subtype frames of control frame, there are Request-To-Send (RTS), Clear-To-Send (CTS), Acknowledgement (ACK), Power Save-Poll (PS-Poll), block ACK (BlockAck), block ACK request (Block-ACKReq), null data packet announcement (NDP announcement), and trigger, etc. If the control frame is not a response frame of the previous frame, it is transmitted after backoff performed after DIFS elapses, and if it is a response frame of the previous frame, it is transmitted without performing backoff after short IFS (SIFS) elapses. The type and subtype of the frame may be identified by a type field and a subtype field in a frame control (FC) field.

A Quality of Service (QOS) STA may perform the backoff that is performed after an arbitration IFS (AIFS) for an access category (AC) to which the frame belongs, that is, AIFS[i] (where i is a value determined by AC), and then may transmit the frame. Here, the frame in which AIFS[i] can be used may be a data frame, a management frame, or a control frame other than a response frame.

Figure 5:
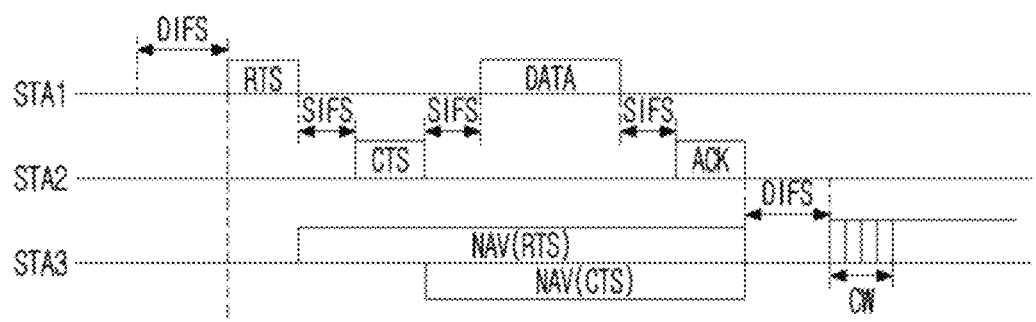
FIG. 5 is a diagram for describing a frame transmission operation based on CSMA/CA to which the present disclosure may be applied.

FIG. 5 is a diagram for explaining a frame transmission operation based on CSMA/CA to which the present disclosure may be applied.

As described above, the CSMA/CA mechanism includes virtual carrier sensing in addition to physical carrier sensing in which a STA directly senses a medium. Virtual carrier sensing is intended to compensate for problems that may occur in medium access, such as a hidden node problem. For virtual carrier sensing, the MAC of the STA may use a Network Allocation Vector (NAV). The NAV is a value indicating, to other STAs, the remaining time until the medium is available for use by an STA currently using or having the right to use the medium. Therefore, the value set as NAV corresponds to a period in which the medium is scheduled to be used by the STA transmitting the frame, and the STA receiving the NAV value is prohibited from accessing the medium during the corresponding period. For example, the NAV may be configured based on the value of the "duration" field of the MAC header of the frame.

In the example of FIG. 5, it is assumed that a STA1 intends to transmit data to a STA2, and a STA3 is in a position capable of overhearing some or all of frames transmitted and received between the STA1 and the STA2.

In order to reduce the possibility of collision of transmissions of multiple STAs in CSMA/CA based frame transmission operation, a mechanism using RTS/CTS frames may be applied. In the example of FIG. 5, while transmission of the STA1 is being performed, as a result of carrier sensing of the STA3, it may be determined that the medium is in an idle state. That is, the STA1 may correspond to a hidden node to the STA3. Alternatively, in the example of FIG. 5, it may be determined that the carrier sensing result medium of the STA3 is in an idle state while transmission of the STA2 is being performed. That is, the STA2 may correspond to a hidden node to the STA3. Through the exchange of RTS/CTS frames before performing data transmission and reception between the STA1 and the STA2, a STA outside the transmission range of one of the STA1 or the STA2, or a STA outside the carrier sensing range for transmission from the STA1 or the STA3 may not attempt to occupy the channel during data transmission and reception between the STA1 and the STA2.

Specifically, the STA1 may determine whether a channel is being used through carrier sensing. In terms of physical carrier sensing, the STA1 may determine a channel occupation idle state based on an energy level or signal correlation detected in a channel. In addition, in terms of virtual carrier sensing, the STA1 may determine a channel occupancy state using a network allocation vector (NAV) timer.

The STA1 may transmit an RTS frame to the STA2 after performing a backoff when the channel is in an idle state during DIFS. When the STA2 receives the RTS frame, the STA2 may transmit a CTS frame as a response to the RTS frame to the STA1 after SIFS.

If the STA3 cannot overhear the CTS frame from the STA2 but can overhear the RTS frame from the STA1, the STA3 may set a NAV timer for a frame transmission period (e.g., SIFS+CTS frame+SIFS+data frame+SIFS+ACK frame) that is continuously transmitted thereafter, using the duration information included in the RTS frame. Alternatively, if the STA3 can overhear a CTS frame from the STA2 although the STA3 cannot overhear an RTS frame from the STA1, the STA3 may set a NAV timer for a frame transmission period (e.g., SIFS+data frame+SIFS+ACK frame) that is continuously transmitted thereafter, using the duration information included in the CTS frame. That is, if the STA3 can overhear one or more of the RTS or CTS frames from one or more of the STA1 or the STA2, the STA3 may set the NAV accordingly. When the STA3 receives a new frame before the NAV timer expires, the STA3 may update the NAV timer using duration information included in the new frame. The STA3 does not attempt channel access until the NAV timer expires.

When the STA1 receives the CTS frame from the STA2, the STA1 may transmit the data frame to the STA2 after SIFS from the time point when the reception of the CTS frame is completed. When the STA2 successfully receives the data frame, the STA2 may transmit an ACK frame as a response to the data frame to the STA1 after SIFS. The STA3 may determine whether the channel is being used through carrier sensing when the NAV timer expires. When the STA3 determines that the channel is not used by other terminals during DIFS after expiration of the NAV timer, the STA3 may attempt channel access after a contention window (CW) according to a random backoff has passed.

Figure 6:
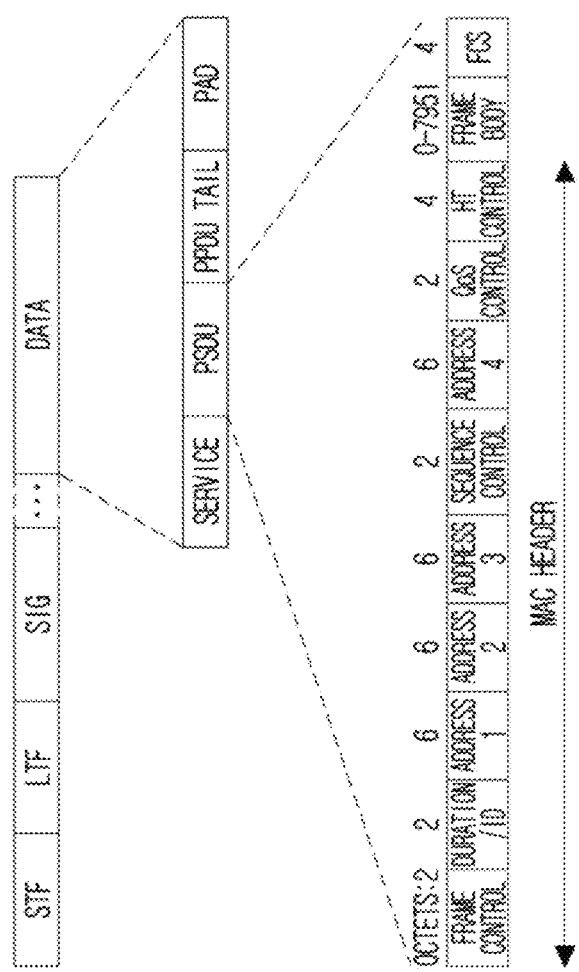
FIG. 6 is a diagram for describing an example of a frame structure used in a WLAN system to which the present disclosure may be applied.

FIG. 6 is a diagram for explaining an example of a frame structure used in a WLAN system to which the present disclosure may be applied.

By means of an instruction or primitive (meaning a set of instructions or parameters) from the MAC layer, the PHY layer may prepare a MAC PDU (MPDU) to be transmitted. For example, when a command requesting transmission start of the PHY layer is received from the MAC layer, the PHY layer switches to the transmission mode and configures information (e.g., data) provided from the MAC layer in the form of a frame and transmits it. In addition, when the PHY layer detects a valid preamble of the received frame, the PHY layer monitors the header of the preamble and sends a command notifying the start of reception of the PHY layer to the MAC layer.

In this way, information transmission/reception in a wireless LAN system is performed in the form of a frame, and for this purpose, a PHY layer protocol data unit (PPDU) frame format is defined.

A basic PPDU frame may include a Short Training Field (STF), a Long Training Field (LTF), a SIGNAL (SIG) field, and a Data field. The most basic (e.g., non-High Throughput (HT)) PPDU frame format may consist of only L-STF (Legacy-STF), L-LTF (Legacy-LTF), SIG field, and data field. In addition, depending on the type of PPDU frame format (e.g., HT-mixed format PPDU, HT-greenfield format PPDU, VHT (Very High Throughput) PPDU, etc.), an additional (or different type) STF, LTF, and SIG fields may be included between the SIG field and the data field (this will be described later with reference to FIG. 7).

The STF is a signal for signal detection, automatic gain control (AGC), diversity selection, precise time synchronization, and the like, and the LTF is a signal for channel estimation and frequency error estimation. The STF and LTF may be referred to as signals for synchronization and channel estimation of the OFDM physical layer.

The SIG field may include a RATE field and a LENGTH field. The RATE field may include information on modulation and coding rates of data. The LENGTH field may include information on the length of data. Additionally, the SIG field may include a parity bit, a SIG TAIL bit, and the like.

The data field may include a SERVICE field, a physical layer service data unit (PSDU), and a PPDU TAIL bit, and may also include padding bits if necessary. Some bits of the SERVICE field may be used for synchronization of the descrambler at the receiving end. The PSDU corresponds to the MAC PDU defined in the MAC layer, and may include data generated/used in the upper layer. The PPDU TAIL bit may be used to return the encoder to a 0 state. Padding bits may be used to adjust the length of a data field in a predetermined unit.

A MAC PDU is defined according to various MAC frame formats, and a basic MAC frame consists of a MAC header, a frame body, and a Frame Check Sequence (FCS). The MAC frame may consist of MAC PDUs and be transmitted/received through the PSDU of the data part of the PPDU frame format.

The MAC header includes a Frame Control field, a Duration/ID field, an Address field, and the like. The frame control field may include control information required for frame transmission/reception. The duration/ID field may be set to a time for transmitting a corresponding frame or the like. For details of the Sequence Control, QoS Control, and HT Control subfields of the MAC header, refer to the IEEE 802.11 standard document.

A null-data packet (NDP) frame format means a frame format that does not include a data packet. That is, the NDP frame refers to a frame format that includes a physical layer convergence procedure (PLCP) header part (i.e., STF, LTF, and SIG fields) in a general PPDU frame format and does not include the remaining parts (i.e., data field). A NDP frame may also be referred to as a short frame format.

Figure 7:
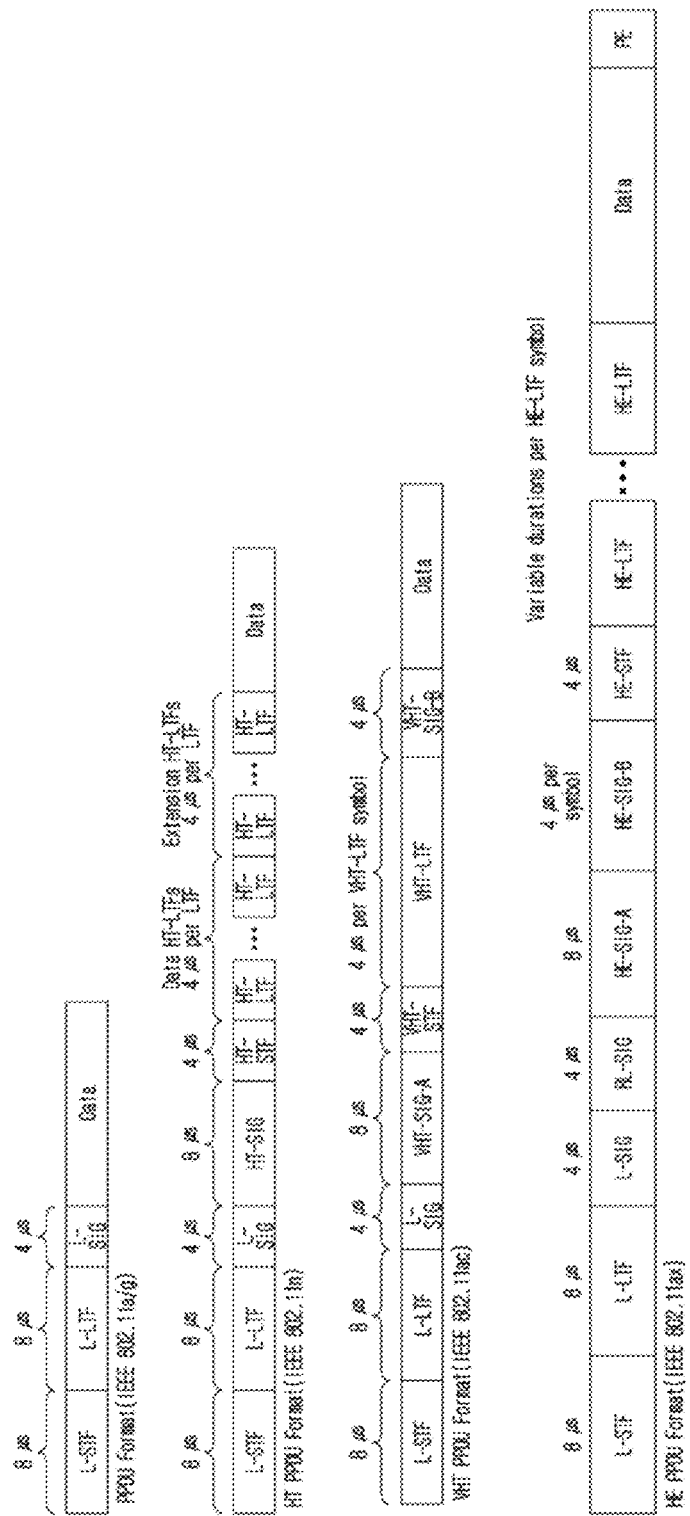
FIG. 7 is a diagram illustrating examples of PPDUs defined in the IEEE 802.11 standard to which the present disclosure may be applied.

FIG. 7 is a diagram illustrating examples of PPDUs defined in the IEEE 802.11 standard to which the present disclosure may be applied.

In standards such as IEEE 802.11a/g/n/ac/ax, various types of PPDUs have been used. The basic PPDU format (IEEE 802.11a/g) includes L-LTF, L-STF, L-SIG and Data fields. The basic PPDU format may also be referred to as a non-HT PPDU format.

The HT PPDU format (IEEE 802.11n) additionally includes HT-SIG, HT-STF, and HT-LFT(s) fields to the basic PPDU format. The HT PPDU format shown in FIG. 7 may be referred to as an HT-mixed format. In addition, an HT-greenfield format PPDU may be defined, and this corresponds to a format consisting of HT-GF-STF, HT-LTF1, HT-SIG, one or more HT-LTF, and Data field, not including L-STF, L-LTF, and L-SIG (not shown).

An example of the VHT PPDU format (IEEE 802.11ac) additionally includes VHT SIG-A, VHT-STF, VHT-LTF, and VHT-SIG-B fields to the basic PPDU format.

An example of the HE PPDU format (IEEE 802.11ax) additionally includes Repeated L-SIG (RL-SIG), HE-SIG-A, HE-SIG-B, HE-STF, HE-LTF(s), Packet Extension (PE) field to the basic PPDU format. Some fields may be excluded or their length may vary according to detailed examples of the HE PPDU format. For example, the HE-SIG-B field is included in the HE PPDU format for multi-user (MU), and the HE-SIG-B is not included in the HE PPDU format for single user (SU). In addition, the HE trigger-based (TB) PPDU format does not include the HE-SIG-B, and the length of the HE-STF field may vary to 8 us. The Extended Range (HE ER) SU PPDU format does not include the HE-SIG-B field, and the length of the HE-SIG-A field may vary to 16 us.

Figure 8:
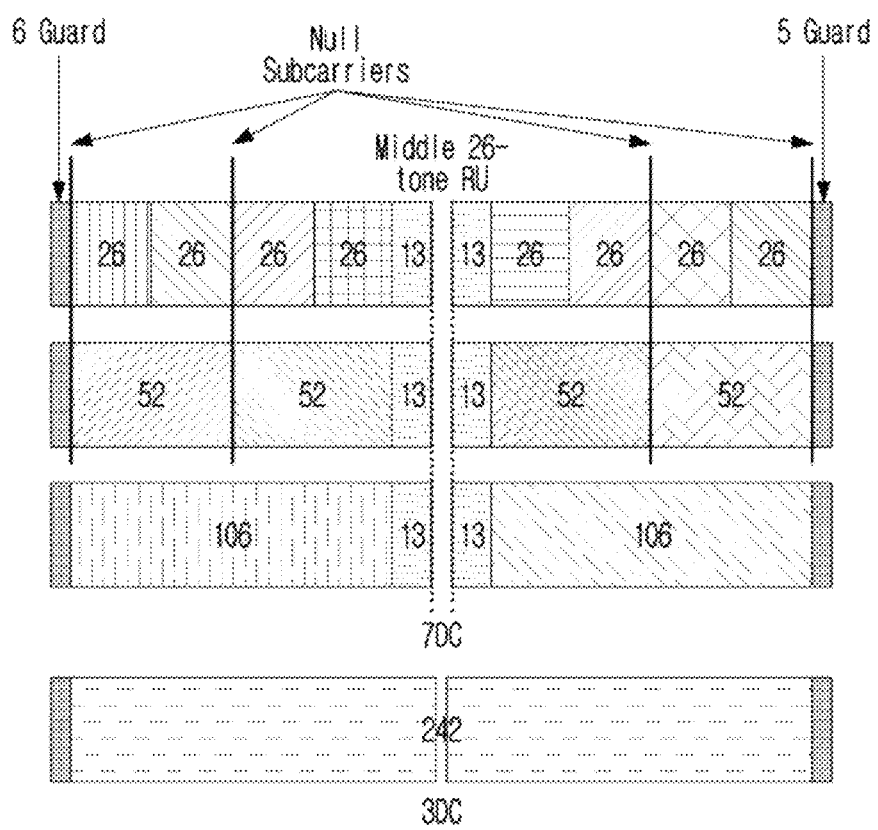
FIGS. 8 to 10 are diagrams for describing examples of resource units of a WLAN system to which the present disclosure may be applied.
Figure 9:
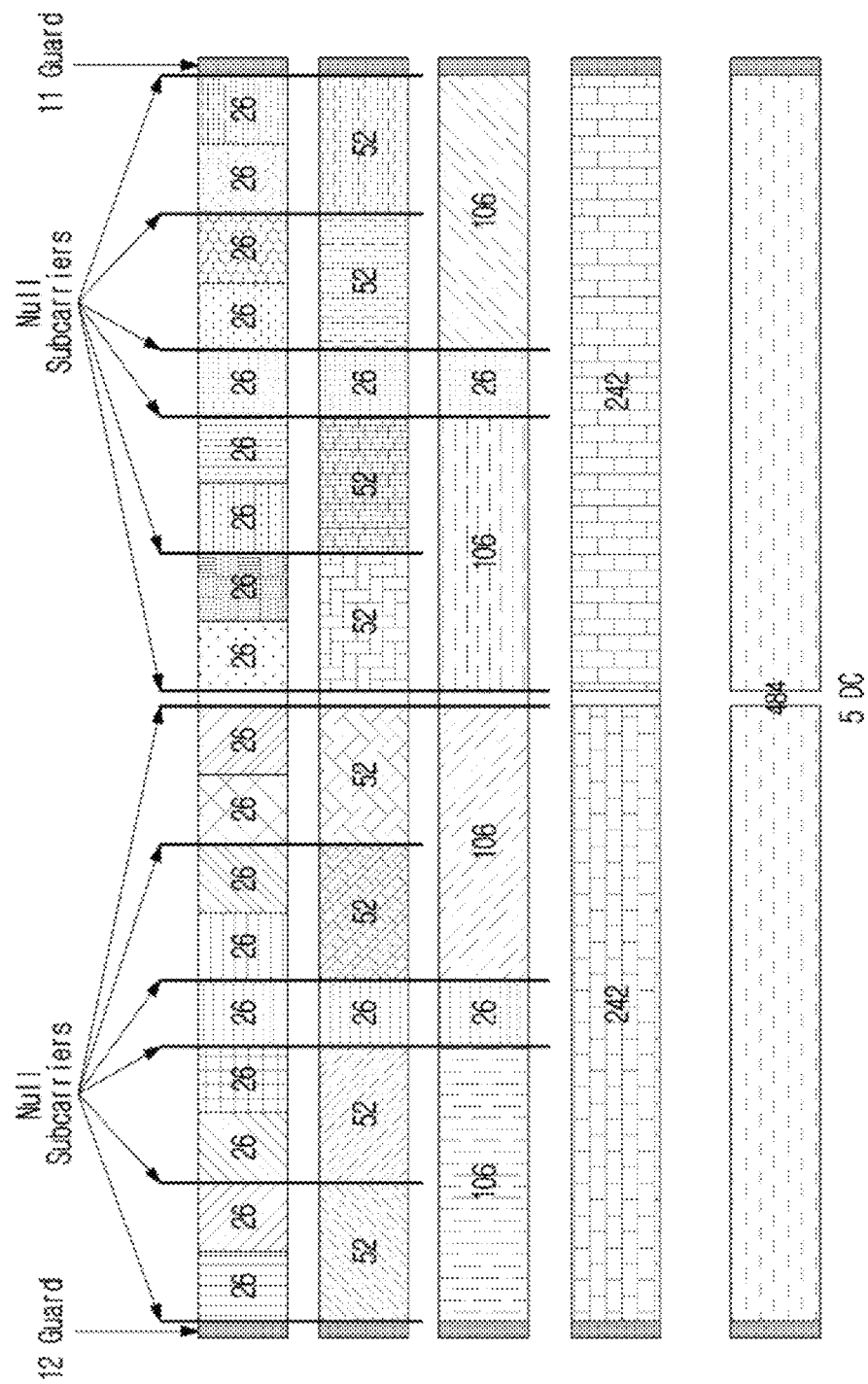
Figure 10:
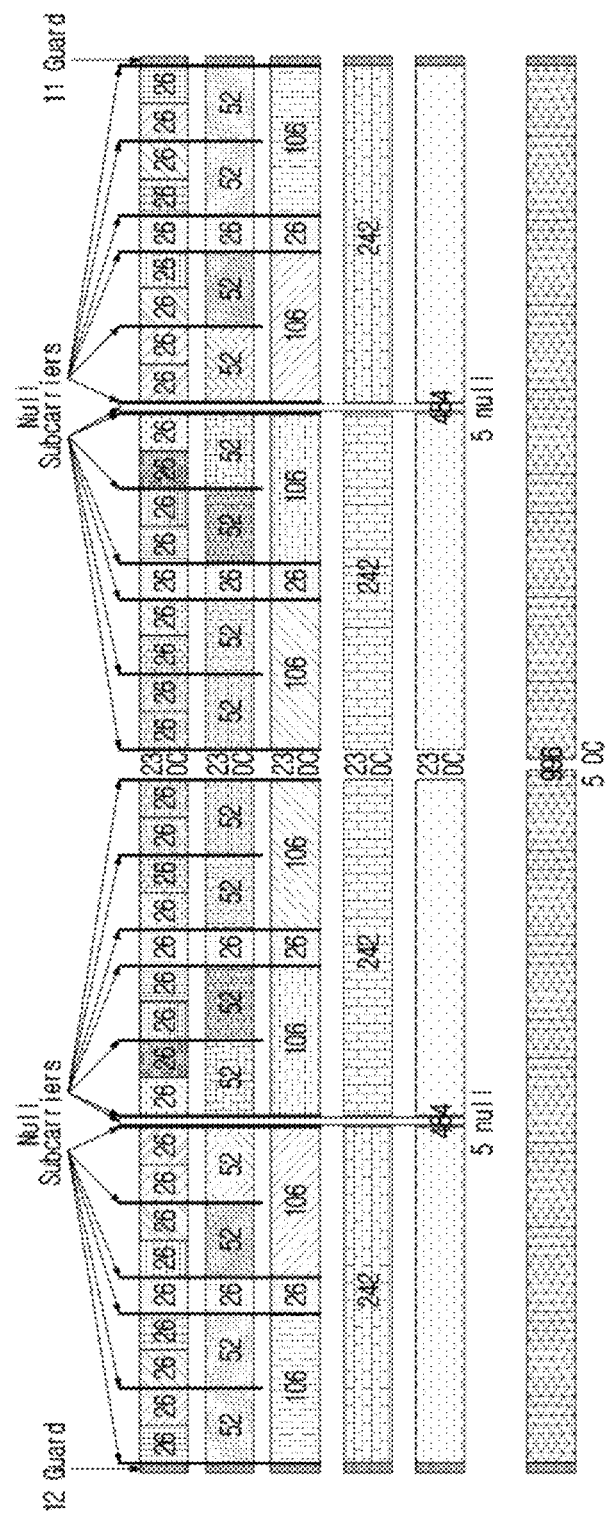

FIGS. 8 to 10 are diagrams for explaining examples of resource units of a WLAN system to which the present disclosure may be applied.

Referring to FIGS. 8 to 10, a resource unit (RU) defined in a wireless LAN system will be described. the RU may include a plurality of subcarriers (or tones). The RU may be used when transmitting signals to multiple STAs based on the OFDMA scheme. In addition, the RU may be defined even when a signal is transmitted to one STA. The RU may be used for STF, LTF, data field of the PPDU, etc.

As shown in FIGS. 8 to 10, RUs corresponding to different numbers of tones (i.e., subcarriers) are used to construct some fields of 20 MHz, 40 MHz, or 80 MHz X-PPDUs (X is HE, EHT, etc.). For example, resources may be allocated in RU units shown for the X-STF, X-LTF, and Data field.

FIG. 8 is a diagram illustrating an exemplary allocation of resource units (RUs) used on a 20 MHz band.

As shown at the top of FIG. 8, 26-units (i.e., units corresponding to 26 tones) may be allocated. 6 tones may be used as a guard band in the leftmost band of the 20 MHz band, and 5 tones may be used as a guard band in the rightmost band of the 20 MHz band. In addition, 7 DC tones are inserted in the center band, that is, the DC band, and 26-units corresponding to each of the 13 tones may exist on the left and right sides of the DC band. In addition, 26-unit, 52-unit, and 106-unit may be allocated to other bands. Each unit may be allocated for STAs or users.

The RU allocation of FIG. 8 is utilized not only in a situation for multiple users (MU) but also in a situation for a single user (SU), and in this case, it is possible to use one 242-unit as shown at the bottom of FIG. 8. In this case, three DC tones may be inserted.

In the example of FIG. 8, RUs of various sizes, that is, 26-RU, 52-RU, 106-RU, 242-RU, etc. are exemplified, but the specific size of these RUs may be reduced or expanded. Therefore, in the present disclosure, the specific size of each RU (i.e., the number of corresponding tones) is exemplary and not restrictive. In addition, within a predetermined bandwidth (e.g., 20, 40, 80, 160, 320 MHz, . . . ) in the present disclosure, the number of RUs may vary according to the size of the RU. In the examples of FIG. 9 and/or FIG. 10 to be described below, the fact that the size and/or number of RUs may be varied is the same as the example of FIG. 8.

FIG. 9 is a diagram illustrating an exemplary allocation of resource units (RUs) used on a 40 MHz band.

Just as RUs of various sizes are used in the example of FIG. 8, 26-RU, 52-RU, 106-RU, 242-RU, 484-RU, and the like may be used in the example of FIG. 9 as well. In addition, 5 DC tones may be inserted at the center frequency, 12 tones may be used as a guard band in the leftmost band of the 40 MHz band, and 11 tones may be used as a guard band in the rightmost band of the 40 MHz band.

In addition, as shown, when used for a single user, a 484-RU may be used.

FIG. 10 is a diagram illustrating an exemplary allocation of resource units (RUs) used on an 80 MHz band.

Figure 26:
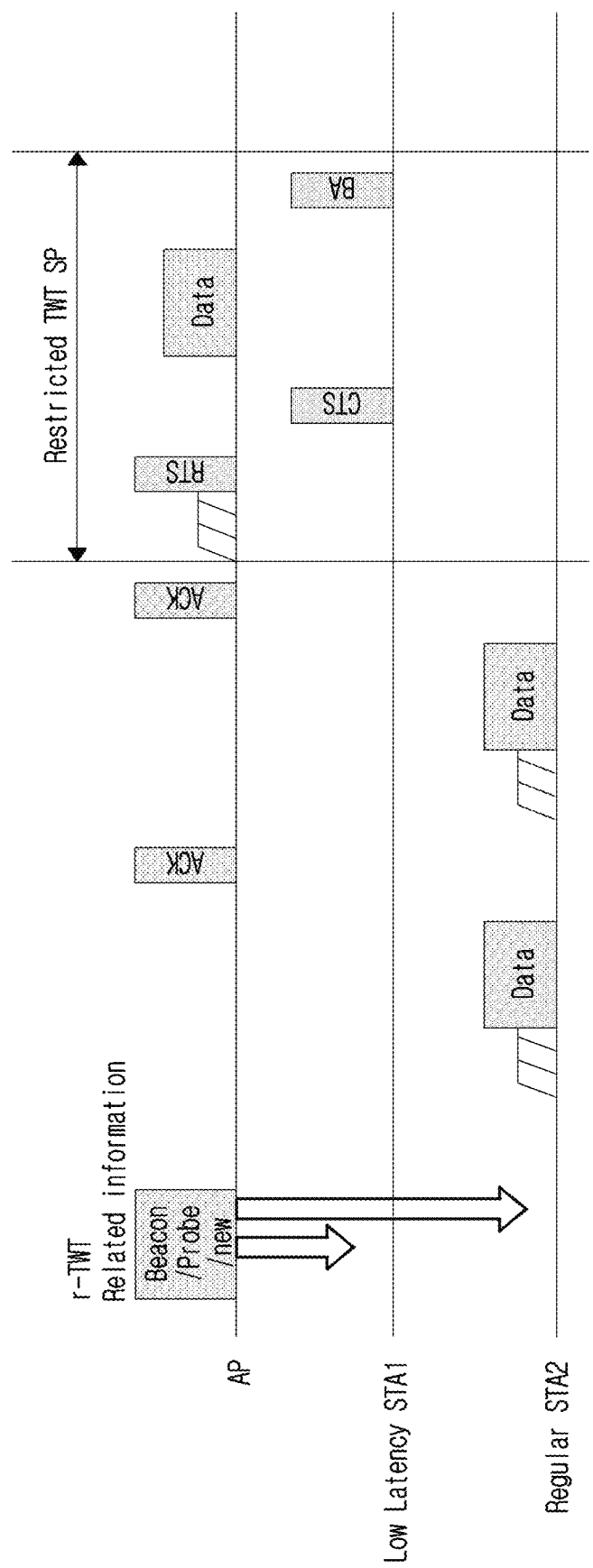
FIGS. 26, 27, and 28 are diagrams illustrating a process in which an AP notifies information related to r-TWT to other STAs according to an example of the present disclosure.

Just as RUs of various sizes are used in the example of FIG. 8 and FIG. 9, 26-RU, 52-RU, 106-RU, 242-RU, 484-RU, 996-RU and the like may be used in the example of FIG. 10 as well. In addition, in the case of an 80 MHz PPDU, RU allocation of HE PPDUs and EHT PPDUs may be different, and the example of FIG. 10 shows an example of RU allocation for 80 MHz EHT PPDUs. The scheme that 12 tones are used as a guard band in the leftmost band of the 80 MHz band and 11 tones are used as a guard band in the rightmost band of the 80 MHz band in the example of FIG. 10 is the same in HE PPDU and EHT PPDU. Unlike HE PPDU, where 7 DC tones are inserted in the DC band and there is one 26-RU corresponding to each of the 13 tones on the left and right sides of the DC band, in the EHT PPDU, 23 DC tones are inserted into the DC band, and one 26-RU exists on the left and right sides of the DC band. Unlike the HE PPDU, where one null subcarrier exists between 242-RUs rather than the center band, there are five null subcarriers in the EHT PPDU. In the HE PPDU, one 484-RU does not include null subcarriers, but in the EHT PPDU, one 484-RU includes 5 null subcarriers.

In addition, as shown, when used for a single user, 996-RU may be used, and in this case, 5 DC tones are inserted in common with HE PPDU and EHT PPDU.

EHT PPDUs over 160 MHz may be configured with a plurality of 80 MHz subblocks in FIG. 10. The RU allocation for each 80 MHz subblock may be the same as that of the 80 MHz EHT PPDU of FIG. 10. If the 80 MHz subblock of the 160 MHz or 320 MHz EHT PPDU is not punctured and the entire 80 MHz subblock is used as part of RU or multiple RU (MRU), the 80 MHz subblock may use 996-RU of FIG. 10.

Here, the MRU corresponds to a group of subcarriers (or tones) composed of a plurality of RUs, and the plurality of RUs constituting the MRU may be RUs having the same size or RUs having different sizes. For example, a single MRU may be defined as 52+26-tone, 106+26-tone, 484+242-tone, 996+484-tone, 996+484+242-tone, 2×996+484-tone, 3×996-tone, or 3×996+484-tone. Here, the plurality of RUs constituting one MRU may correspond to small size (e.g., 26, 52, or 106) RUs or large size (e.g., 242, 484, or 996) RUs. That is, one MRU including a small size RU and a large size RU may not be configured/defined. In addition, a plurality of RUs constituting one MRU may or may not be consecutive in the frequency domain.

When an 80 MHz subblock includes RUs smaller than 996 tones, or parts of the 80 MHz subblock are punctured, the 80 MHz subblock may use RU allocation other than the 996-tone RU.

The RU of the present disclosure may be used for uplink (UL) and/or downlink (DL) communication. For example, when trigger-based UL-MU communication is performed, the STA transmitting the trigger (e.g., AP) may allocate a first RU (e.g., 26/52/106/242-RU, etc.) to a first STA and allocate a second RU (e.g., 26/52/106/242-RU, etc.) to a second STA, through trigger information (e.g., trigger frame or triggered response scheduling (TRS)). Thereafter, the first STA may transmit a first trigger-based (TB) PPDU based on the first RU, and the second STA may transmit a second TB PPDU based on the second RU. The first/second TB PPDUs may be transmitted to the AP in the same time period.

For example, when a DL MU PPDU is configured, the STA transmitting the DL MU PPDU (e.g., AP) may allocate a first RU (e.g., 26/52/106/242-RU, etc.) to a first STA and allocate a second RU (e.g., 26/52/106/242-RU, etc.) to a second STA. That is, the transmitting STA (e.g., AP) may transmit the HE-STF, HE-LTF, and Data fields for the first STA through the first RU within one MU PPDU, and may transmit the HE-STF, HE-LTF, and Data fields for the second STA through the second RU.

Information on the allocation of RUs may be signaled through HE-SIG-B in the HE PPDU format.

Figure 11:
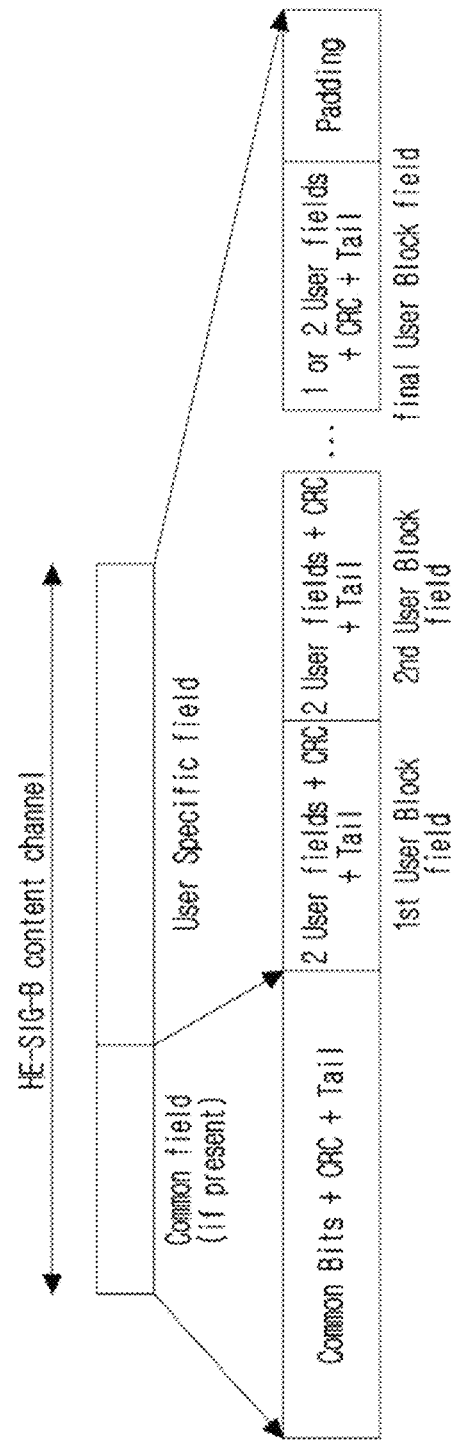
FIG. 11 illustrates an example structure of a HE-SIG-B field.

FIG. 11 illustrates an example structure of a HE-SIG-B field.

As shown, the HE-SIG-B field may include a common field and a user-specific field. If HE-SIG-B compression is applied (e.g., full-bandwidth MU-MIMO transmission), the common field may not be included in HE-SIG-B, and the HE-SIG-B content channel may include only a user-specific field. If HE-SIG-B compression is not applied, the common field may be included in HE-SIG-B.

The common field may include information on RU allocation (e.g., RU assignment, RUs allocated for MU-MIMO, the number of MU-MIMO users (STAs), etc.)

The common field may include N*8 RU allocation subfields. Here, N is the number of subfields, N=1 in the case of 20 or 40 MHz MU PPDU, N=2 in the case of 80 MHz MU PPDU, N=4 in the case of 160 MHz or 80+80 MHz MU PPDU, etc. One 8-bit RU allocation subfield may indicate the size (26, 52, 106, etc.) and frequency location (or RU index) of RUs included in the 20 MHz band.

For example, if a value of the 8-bit RU allocation subfield is 00000000, it may indicate that nine 26-RUs are sequentially allocated in order from the leftmost to the rightmost in the example of FIG. 8, if the value is 00000001, it may indicate that seven 26-RUs and one 52-RU are sequentially allocated in order from leftmost to rightest, and if the value is 00000010, it may indicate that five 26-RUs, one 52-RU, and two 26-RUs are sequentially allocated from the leftmost side to the rightmost side.

As an additional example, if the value of the 8-bit RU allocation subfield is 01000y2y1y0, it may indicate that one 106-RU and five 26-RUs are sequentially allocated from the leftmost to the rightmost in the example of FIG. 8. In this case, multiple users/STAs may be allocated to the 106-RU in the MU-MIMO scheme. Specifically, up to 8 users/STAs may be allocated to the 106-RU, and the number of users/STAs allocated to the 106-RU is determined based on 3-bit information (i.e., y2y1y0). For example, when the 3-bit information (y2y1y0) corresponds to a decimal value N, the number of users/STAs allocated to the 106-RU may be N+1.

Basically, one user/STA may be allocated to each of a plurality of RUs, and different users/STAs may be allocated to different RUs. For RUs larger than a predetermined size (e.g., 106, 242, 484, 996-tones, . . . ), a plurality of users/STAs may be allocated to one RU, and MU-MIMO scheme may be applied for the plurality of users/STAs.

The set of user-specific fields includes information on how all users (STAs) of the corresponding PPDU decode their payloads. User-specific fields may contain zero or more user block fields. The non-final user block field includes two user fields (i.e., information to be used for decoding in two STAs). The final user block field contains one or two user fields. The number of user fields may be indicated by the RU allocation subfield of HE-SIG-B, the number of symbols of HE-SIG-B, or the MU-MIMO user field of HE-SIG-A. A User-specific field may be encoded separately from or independently of a common field.

Figure 12:
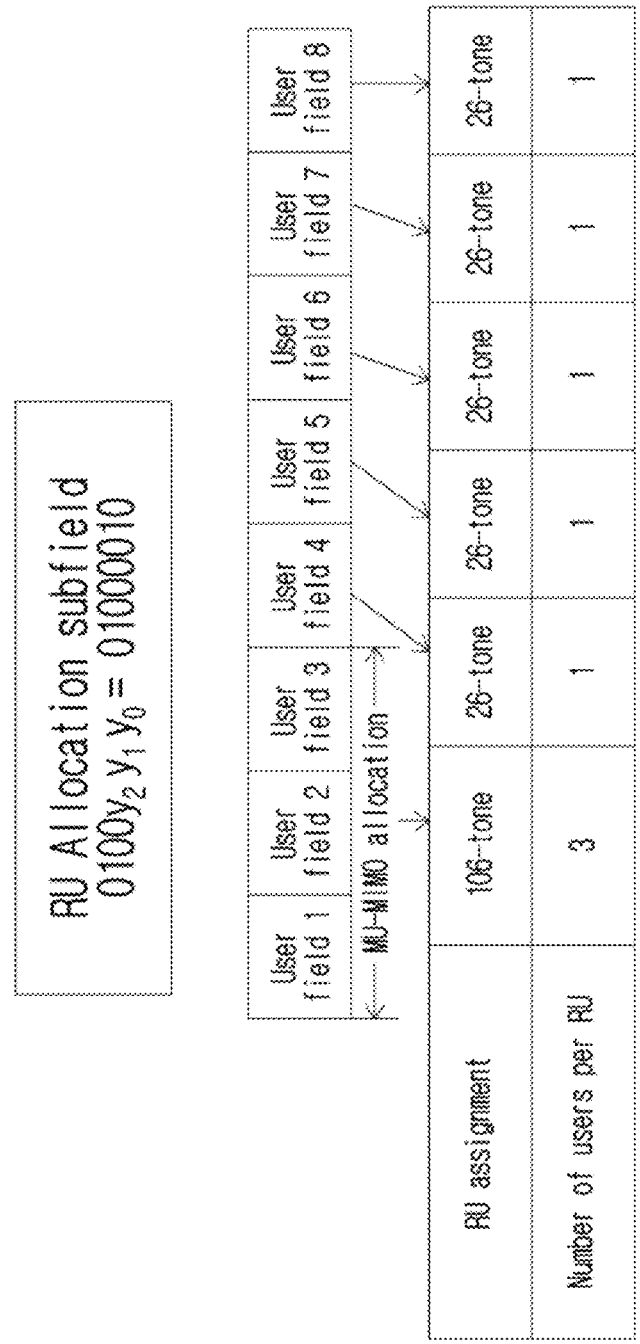
FIG. 12 is a diagram for describing a MU-MIMO method in which a plurality of users/STAs are allocated to one RU.

FIG. 12 is a diagram for explaining a MU-MIMO method in which a plurality of users/STAs are allocated to one RU.

In the example of FIG. 12, it is assumed that the value of the RU allocation subfield is 01000010. This corresponds to the case where y2y1y0=010 in 01000y2y1y0. 010 corresponds to 2 in decimal (i.e., N=2) and may indicate that 3 (=N+1) users are allocated to one RU. In this case, one 106-RU and five 26-RUs may be sequentially allocated from the leftmost side to the rightmost side of a specific 20 MHz band/channel. Three users/STAs may be allocated to the 106-RU in a MU-MIMO manner. As a result, a total of 8 users/STAs are allocated to the 20 MHz band/channel, and the user-specific field of HE-SIG-B may include 8 user fields (i.e., 4 user block fields). Eight user fields may be assigned to RUs as shown in FIG. 12.

The user field may be constructed based on two formats. The user field for a MU-MIMO allocation may be constructed with a first format, and the user field for non-MU-MIMO allocation may be constructed with a second format. Referring to the example of FIG. 12, user fields 1 to 3 may be based on the first format, and user fields 4 to 8 may be based on the second format. The first format and the second format may contain bit information of the same length (e.g., 21 bits).

The user field of the first format (i.e., format for MU-MIMO allocation) may be constructed as follows. For example, out of all 21 bits of one user field, B0-B10 includes the user's identification information (e.g., STA-ID, AID, partial AID, etc.), B11-14 includes spatial configuration information such as the number of spatial streams for the corresponding user, B15-B18 includes Modulation and Coding Scheme (MCS) information applied to the Data field of the corresponding PPDU, B19 is defined as a reserved field, and B20 may include information on a coding type (e.g., binary convolutional coding (BCC) or low-density parity check (LDPC)) applied to the Data field of the corresponding PPDU.

The user field of the second format (i.e., the format for non-MU-MIMO allocation) may be constructed as follows. For example, out of all 21 bits of one user field, B0-B10 includes the user's identification information (e.g., STA-ID, AID, partial AID, etc.), B11-13 includes information on the number of spatial streams (NSTS) applied to the corresponding RU, B14 includes information indicating whether beamforming is performed (or whether a beamforming steering matrix is applied), B15-B18 includes Modulation and Coding Scheme (MCS) information applied to the Data field of the corresponding PPDU, B19 includes information indicating whether DCM (dual carrier modulation) is applied, and B20 may include information on a coding type (e.g., BCC or LDPC) applied to the Data field of the corresponding PPDU.

MCS, MCS information, MCS index, MCS field, and the like used in the present disclosure may be indicated by a specific index value. For example, MCS information may be indicated as index 0 to index 11. MCS information includes information on constellation modulation type (e.g., BPSK, QPSK, 16-QAM, 64-QAM, 256-QAM, 1024-QAM, etc.), and coding rate (e.g., 1/2, 2/3, 3/4, 5/6, etc.). Information on a channel coding type (e.g., BCC or LDPC) may be excluded from the MCS information.

Figure 13:
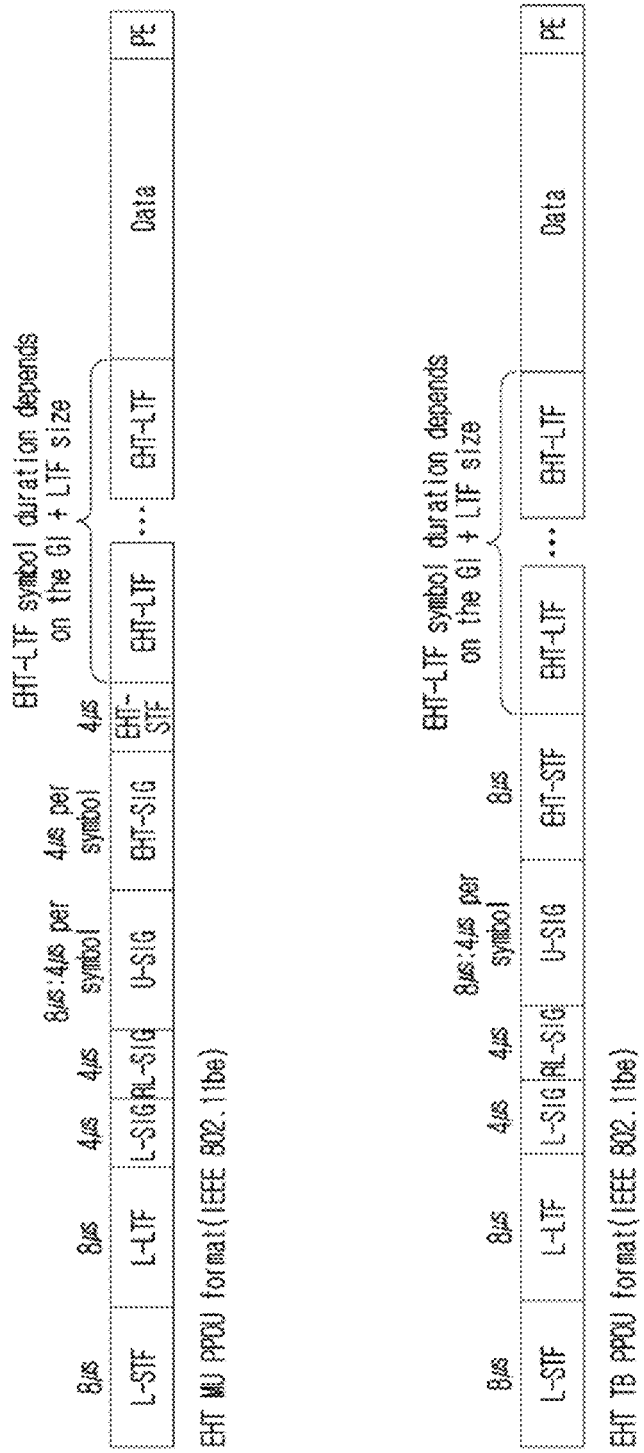
FIG. 13 illustrates an example of a PPDU format to which the present disclosure may be applied.

FIG. 13 illustrates an example of a PPDU format to which the present disclosure may be applied.

The PPDU of FIG. 13 may be referred as various names such as an EHT PPDU, a transmitted PPDU, a received PPDU, a first type or an Nth type PPDU. For example, the PPDU or EHT PPDU of the present disclosure may be referred as various names such as a transmission PPDU, a reception PPDU, a first type or an Nth type PPDU. In addition, the EHT PPU may be used in an EHT system and/or a new wireless LAN system in which the EHT system is improved.

The EHT MU PPDU of FIG. 13 corresponds to a PPDU carrying one or more data (or PSDUs) for one or more users. That is, the EHT MU PPDU may be used for both SU transmission and MU transmission. For example, the EHT MU PPDU may correspond to a PPDU for one receiving STA or a plurality of receiving STAs.

In the EHT TB PPDU of FIG. 13, the EHT-SIG is omitted compared to the EHT MU PPDU. Upon receiving a trigger for UL MU transmission (e.g., a trigger frame or TRS), the STA may perform UL transmission based on the EHT TB PPDU format.

In the example of the EHT PPDU format of FIG. 13, L-STF to EHT-LTF correspond to a preamble or a physical preamble, and may be generated/transmitted/received/acquired/decoded in the physical layer.

A Subcarrier frequency spacing of L-STF, L-LTF, L-SIG, RL-SIG, Universal SIGNAL (U-SIG), EHT-SIG field (these are referred to as pre-EHT modulated fields) may be set to 312.5 kHz. A subcarrier frequency spacing of the EHT-STF, EHT-LTF, Data, and PE field (these are referred to as EHT modulated fields) may be set to 78.125 kHz. That is, the tone/subcarrier index of L-STF, L-LTF, L-SIG, RL-SIG, U-SIG, and EHT-SIG field may be indicated in units of 312.5 kHz, and the tone/subcarrier index of EHT-STF, EHT-LTF, Data, and PE field may be indicated in units of 78.125 kHz.

The L-LTF and L-STF of FIG. 13 may be constructed identically to the corresponding fields of the PPDU described in FIGS. 6 to 7.

The L-SIG field of FIG. 13 may be constructed with 24 bits and may be used to communicate rate and length information. For example, the L-SIG field includes a 4-bit Rate field, a 1-bit Reserved bit, a 12-bit Length field, a 1-bit Parity field, and a 6-bit Tail field may be included. For example, the 12-bit Length field may include information on a time duration or a length of the PPDU. For example, a value of the 12-bit Length field may be determined based on the type of PPDU. For example, for a non-HT, HT, VHT, or EHT PPDU, the value of the Length field may be determined as a multiple of 3. For example, for the HE PPDU, the value of the Length field may be determined as a multiple of 3+1 or a multiple of 3+2.

For example, the transmitting STA may apply BCC encoding based on a coding rate of 1/2 to 24-bit information of the L-SIG field. Thereafter, the transmitting STA may obtain 48-bit BCC coded bits. BPSK modulation may be applied to 48-bit coded bits to generate 48 BPSK symbols. The transmitting STA may map 48 BPSK symbols to any location except for a pilot subcarrier (e.g., {subcarrier index −21, −7, +7, +21}) and a DC subcarrier (e.g., {subcarrier index 0}). As a result, 48 BPSK symbols may be mapped to subcarrier indices −26 to −22, −20 to −8, −6 to −1, +1 to +6, +8 to +20, and +22 to +26. The transmitting STA may additionally map the signals of {−1, −1, −1, 1} to the subcarrier index {−28, −27, +27, +28}. The above signal may be used for channel estimation in the frequency domain corresponding to {−28, −27, +27, +28}.

The transmitting STA may construct RL-SIG which is constructed identically to L-SIG. For RL-SIG, BPSK modulation is applied. The receiving STA may recognize that the received PPDU is a HE PPDU or an EHT PPDU based on the existence of the RL-SIG.

After the RL-SIG of FIG. 13, a Universal SIG (U-SIG) may be inserted. The U-SIG may be referred as various names such as a first SIG field, a first SIG, a first type SIG, a control signal, a control signal field, and a first (type) control signal, etc.

The U-SIG may include N-bit information and may include information for identifying the type of EHT PPDU. For example, U-SIG may be configured based on two symbols (e.g., two consecutive OFDM symbols). Each symbol (e.g., OFDM symbol) for the U-SIG may have a duration of 4 us, and the U-SIG may have a total 8 us duration. Each symbol of the U-SIG may be used to transmit 26 bit information. For example, each symbol of the U-SIG may be transmitted and received based on 52 data tones and 4 pilot tones.

Through the U-SIG (or U-SIG field), for example, A bit information (e.g., 52 un-coded bits) may be transmitted, the first symbol of the U-SIG (e.g., U-SIG-1) may transmit the first X bit information (e.g., 26 un-coded bits) of the total A bit information, and the second symbol of the U-SIG (e.g., U-SIG-2) may transmit the remaining Y-bit information (e.g., 26 un-coded bits) of the total A-bit information. For example, the transmitting STA may obtain 26 un-coded bits included in each U-SIG symbol. The transmitting STA may generate 52-coded bits by performing convolutional encoding (e.g., BCC encoding) based on a rate of R=1/2, and perform interleaving on the 52-coded bits. The transmitting STA may generate 52 BPSK symbols allocated to each U-SIG symbol by performing BPSK modulation on the interleaved 52-coded bits. One U-SIG symbol may be transmitted based on 56 tones (subcarriers) from subcarrier index −28 to subcarrier index +28, except for DC index 0. The 52 BPSK symbols generated by the transmitting STA may be transmitted based on the remaining tones (subcarriers) excluding pilot tones −21, −7, +7, and +21 tones.

For example, the A bit information (e.g., 52 un-coded bits) transmitted by the U-SIG includes a CRC field (e.g., a 4-bit field) and a tail field (e.g., 6 bit-length field). The CRC field and the tail field may be transmitted through the second symbol of the U-SIG. The CRC field may be constructed based on 26 bits allocated to the first symbol of U-SIG and 16 bits remaining except for the CRC/tail field in the second symbol, and may be constructed based on a conventional CRC calculation algorithm. In addition, the tail field may be used to terminate the trellis of the convolution decoder, and for example, the tail field may be set to 0.

A bit information (e.g., 52 un-coded bits) transmitted by the U-SIG (or U-SIG field) may be divided into version-independent bits and version-independent bits. For example, a size of the version-independent bits may be fixed or variable. For example, the version-independent bits may be allocated only to the first symbol of U-SIG, or the version-independent bits may be allocated to both the first symbol and the second symbol of U-SIG. For example, the version-independent bits and the version-dependent bits may be referred as various names such as a first control bit and a second control bit, etc.

For example, the version-independent bits of the U-SIG may include a 3-bit physical layer version identifier (PHY version identifier). For example, the 3-bit PHY version identifier may include information related to the PHY version of the transmitted/received PPDU. For example, the first value of the 3-bit PHY version identifier may indicate that the transmission/reception PPDU is an EHT PPDU. In other words, when transmitting the EHT PPDU, the transmitting STA may set the 3-bit PHY version identifier to a first value. In other words, the receiving STA may determine that the received PPDU is an EHT PPDU based on the PHY version identifier having the first value.

For example, the version-independent bits of U-SIG may include a 1-bit UL/DL flag field A first value of the 1-bit UL/DL flag field is related to UL communication, and a second value of the UL/DL flag field is related to DL communication.

For example, the version-independent bits of the U-SIG may include information on the length of a transmission opportunity (TXOP) and information on a BSS color ID.

For example, if the EHT PPDU is classified into various types (e.g., EHT PPDU related to SU mode, EHT PPDU related to MU mode, EHT PPDU related to TB mode, EHT PPDU related to Extended Range transmission, etc.), information on the type of EHT PPDU may be included in the version-dependent bits of the U-SIG.

For example, the U-SIG may include information on 1) a bandwidth field containing information on a bandwidth, 2) a field containing information on a MCS scheme applied to EHT-SIG, 3) an indication field containing information related to whether the DCM technique is applied to the EHT-SIG, 4) a field containing information on the number of symbols used for EHT-SIG, 5) a field containing information on whether EHT-SIG is constructed over all bands, 6) a field containing information on the type of EHT-LTF/STF, and 7) a field indicating the length of EHT-LTF and CP length.

Preamble puncturing may be applied to the PPDU of FIG. 13. Preamble puncturing may mean transmission of a PPDU for which no signal is present in one or more 20 MHz subchannels among the bandwidth of the PPDU. Preamble puncturing may be applied to a PPDU transmitted to one or more users. For example, the resolution of preamble puncturing may be 20 MHz for EHT MU PPDUs in OFDMA transmissions with bandwidths greater than 40 MHz and non-OFDMA transmissions with 80 MHz and 160 MHz bandwidths. That is, in the above case, puncturing on a subchannel smaller than 242-tone RU may not be allowed. In addition, for an EHT MU PPDU in non-OFDMA transmission with a bandwidth of 320 MHz, the resolution of preamble puncturing may be 40 MHz. That is, puncturing for a subchannel smaller than 484-tone RU in a 320 MHz bandwidth may not be allowed. In addition, preamble puncturing may not be applied to the primary 20 MHz channel in the EHT MU PPDU.

For example, for an EHT MU PPDU, information on preamble puncturing may be included in the U-SIG and/or the EHT-SIG. For example, the first field of the U-SIG may include information on the contiguous bandwidth of the PPDU, and the second field of the U-SIG may include information on preamble puncturing applied to the PPDU.

For example, the U-SIG and the EHT-SIG may include information on preamble puncturing based on the following method. If the bandwidth of the PPDU exceeds 80 MHz, the U-SIG may be individually constructed in units of 80 MHz. For example, if the bandwidth of the PPDU is 160 MHz, the PPDU may include a first U-SIG for a first 80 MHz band and a second U-SIG for a second 80 MHz band. In this case, the first field of the first U-SIG includes information on the 160 MHz bandwidth, and the second field of the first U-SIG includes information on preamble puncturing applied to the first 80 MHz band (i.e., information on a preamble puncturing pattern). In addition, the first field of the second U-SIG includes information on a 160 MHz bandwidth, and the second field of the second U-SIG includes information on preamble puncturing applied to a second 80 MHz band (i.e., information on a preamble puncturing pattern). The EHT-SIG following the first U-SIG may include information on preamble puncturing applied to the second 80 MHz band (i.e., information on a preamble puncturing pattern), and the EHT-SIG following the second U-SIG may include information on preamble puncturing applied to the first 80 MHz band (i.e., information on a preamble puncturing pattern).

Additionally or alternatively, the U-SIG and the EHT-SIG may include information on preamble puncturing based on the following method. The U-SIG may include information on preamble puncturing for all bands (i.e., information on a preamble puncturing pattern). That is, EHT-SIG does not include information on preamble puncturing, and only U-SIG may include information on preamble puncturing (i.e., information on a preamble puncturing pattern).

U-SIG may be constructed in units of 20 MHz. For example, if an 80 MHz PPDU is constructed, the U-SIG may be duplicated. That is, the same 4 U-SIGs may be included in the 80 MHz PPDU. PPDUs exceeding 80 MHz bandwidth may include different U-SIGs.

The EHT-SIG of FIG. 13 may include control information for the receiving STA. EHT-SIG may be transmitted through at least one symbol, and one symbol may have a length of 4 us. Information on the number of symbols used for EHT-SIG may be included in U-SIG.

The EHT-SIG may include technical features of HE-SIG-B described through FIGS. 11 and 12. For example, EHT-SIG, like the example of FIG. 8, may include a common field and a user-specific field. The Common field of the EHT-SIG may be omitted, and the number of user-specific fields may be determined based on the number of users.

As in the example of FIG. 11, the common field of the EHT-SIG and the user-specific field of the EHT-SIG may be coded separately. One user block field included in the user-specific field may contain information for two user fields, but the last user block field included in the user-specific field may contain one or two user fields. That is, one user block field of the EHT-SIG may contain up to two user fields. As in the example of FIG. 12, each user field may be related to MU-MIMO allocation or non-MU-MIMO allocation.

In the same way as in the example of FIG. 11, the common field of the EHT-SIG may include a CRC bit and a Tail bit, The length of the CRC bit may be determined as 4 bits, and the length of the tail bit is determined by 6 bits and may be set to 000000.

As in the example of FIG. 11, the common field of the EHT-SIG may include RU allocation information. RU allocation information may mean information on the location of an RU to which a plurality of users (i.e., a plurality of receiving STAs) are allocated. RU allocation information may be configured in units of 9 bits (or N bits).

A mode in which a common field of EHT-SIG is omitted may be supported. The mode in which the common field of the EHT-SIG is omitted may be referred as a compressed mode. When the compressed mode is used, a plurality of users (i.e., a plurality of receiving STAs) of the EHT PPDU may decode the PPDU (e.g., the data field of the PPDU) based on non-OFDMA. That is, a plurality of users of the EHT PPDU may decode a PPDU (e.g., a data field of the PPDU) received through the same frequency band. When a non-compressed mode is used, multiple users of the EHT PPDU may decode the PPDU (e.g., the data field of the PPDU) based on OFDMA. That is, a plurality of users of the EHT PPDU may receive the PPDU (e.g., the data field of the PPDU) through different frequency bands.

EHT-SIG may be constructed based on various MCS scheme. As described above, information related to the MCS scheme applied to the EHT-SIG may be included in the U-SIG. The EHT-SIG may be constructed based on the DCM scheme. The DCM scheme may reuse the same signal on two subcarriers to provide an effect similar to frequency diversity, reduce interference, and improve coverage. For example, modulation symbols to which the same modulation scheme is applied may be repeatedly mapped on available tones/subcarriers. For example, modulation symbols (e.g., BPSK modulation symbols) to which a specific modulation scheme is applied may be mapped to first contiguous half tones (e.g., 1st to 26th tones) among the N data tones (e.g., 52 data tones) allocated for EHT-SIG, and modulation symbols (e.g., BPSK modulation symbols) to which the same specific modulation scheme is applied may be mapped to the remaining contiguous half tones (e.g., 27th to 52nd tones). That is, a modulation symbol mapped to the 1st tone and a modulation symbol mapped to the 27th tone are the same. As described above, information related to whether the DCM scheme is applied to the EHT-SIG (e.g., a 1-bit field) may be included in the U-SIG. The EHT-STF of FIG. 13 may be used to enhance automatic gain control (AGC)

estimation in a MIMO environment or an OFDMA environment. The EHT-LTF of FIG. 13 may be used to estimate a channel in a MIMO environment or an OFDMA environment.

Information on the type of STF and/or LTF (including information on a guard interval (GI) applied to LTF) may be included in the U-SIG field and/or the EHT-SIG field of FIG. 13.

The PPDU (i.e., EHT PPDU) of FIG. 13 may be constructed based on an example of RU allocation of FIGS. 8 to 10.

For example, a EHT PPDU transmitted on a 20 MHz band, that is, a 20 MHz EHT PPDU may be constructed based on the RU of FIG. 8. That is, a RU location of EHT-STF, EHT-LTF, and data field included in the EHT PPDU may be determined as shown in FIG. 8. A EHT PPDU transmitted on a 40 MHz band, that is, a 40 MHz EHT PPDU may be constructed based on the RU of FIG. 9. That is, a RU location of EHT-STF, EHT-LTF, and data field included in the EHT PPDU may be determined as shown in FIG. 9.

The EHT PPDU transmitted on the 80 MHz band, that is, the 80 MHz EHT PPDU may be constructed based on the RU of FIG. 10. That is, a RU location of EHT-STF, EHT-LTF, and data field included in the EHT PPDU may be determined as shown in FIG. 10. The tone-plan for 80 MHz in FIG. 10 may correspond to two repetitions of the tone-plan for 40 MHz in FIG. 9.

The tone-plan for 160/240/320 MHz may be configured in the form of repeating the pattern of FIG. 9 or 10 several times.

The PPDU of FIG. 13 may be identified as an EHT PPDU based on the following method.

The receiving STA may determine the type of the received PPDU as the EHT PPDU based on the following. For example, when 1) the first symbol after the L-LTF signal of the received PPDU is BPSK, 2) RL-SIG in which the L-SIG of the received PPDU is repeated is detected, and 3) the result of applying the modulo 3 calculation to the value of the Length field of the L-SIG of the received PPDU (i.e., the remainder after dividing by 3) is detected as 0, the received PPDU may be determined as a EHT PPDU. When the received PPDU is determined to be an EHT PPDU, the receiving STA may determine the type of the EHT PPDU based on bit information included in symbols subsequent to the RL-SIG of FIG. 13. In other words, the receiving STA may determine the received PPDU as a EHT PPDU, based on 1) the first symbol after the L-LTF signal, which is BSPK, 2) RL-SIG contiguous to the L-SIG field and identical to the L-SIG, and 3) L-SIG including a Length field in which the result of applying modulo 3 is set to 0.

For example, the receiving STA may determine the type of the received PPDU as the HE PPDU based on the following. For example, when 1) the first symbol after the L-LTF signal is BPSK, 2) RL-SIG in which L-SIG is repeated is detected, and 3) the result of applying modulo 3 to the length value of L-SIG is detected as 1 or 2, the received PPDU may be determined as a HE PPDU.

For example, the receiving STA may determine the type of the received PPDU as non-HT, HT, and VHT PPDU based on the following. For example, when 1) the first symbol after the L-LTF signal is BPSK and 2) RL-SIG in which L-SIG is repeated is not detected, the received PPDU may be determined as non-HT, HT, and VHT PPDU.

In addition, when the receiving STA detects an RL-SIG in which the L-SIG is repeated in the received PPDU, it may be determined that the received PPDU is a HE PPDU or an EHT PPDU. In this case, if the rate (6 Mbps) check fails, the received PPDU may be determined as a non-HT, HT, or VHT PPDU. If the rate (6 Mbps) check and parity check pass, when the result of applying modulo 3 to the Length value of L-SIG is detected as 0, the received PPDU may be determined as an EHT PPDU, and when the result of Length mod 3 is not 0, it may be determined as a HE PPDU.

The PPDU of FIG. 13 may be used to transmit and receive various types of frames. For example, the PPDU of FIG. 13 may be used for (simultaneous) transmission and reception of one or more of a control frame, a management frame, or a data frame.

Hereinafter, the U-SIG included in the EHT PPDU will be described in more detail.

For a 40 MHz EHT PPDU or Extended Range (ER) preamble, the U-SIG content is the same in both 20 MHz subchannels. For an 80 MHz EHT PPDU or ER preamble, the U-SIG content is the same in all non-punctured 20 MHz subchannels. For a 160/320 MHz EHT PPDU or ER preamble, the U-SIG content is the same on all non-punctured 20 MHz subchannels within each 80 MHz subblock and may be different from the U-SIG content in other 80 MHz subblocks.

The U-SIG-1 part of the U-SIG of the EHT MU PPDU may include PHY version identifier (B0-B2), BW (B3-B5), UL/DL (B6), BSS color (B7-B12), and TXOP (B13-B19), and U-SIG-2 part may include PPDU type and compression mode (B0-B1), validate (B2), punctured channel information (B3-B7), validate (B8), EHT-SIG MCS (B9-B10), number of EHT-SIG symbols (B11-B15), CRC (B16-B19), and tail (B20-B25).

Next, the U-SIG-1 part of the U-SIG of the EHT TB PPDU may include a version identifier (B0-B2), BW (B3-B5), UL/DL (B6), BSS color (B7-B12), TXOP (B13-B19), and disregard (B20-B25), and U-SIG-2 part may include PPDU type and compression mode (B0-B1), validate (B2), spatial reuse 1 (B3-B6), spatial reuse 2 (B7-B10), disregard (B11-B15), CRC (B16-B19), and tail (B20-B25).

As described above, the U-SIG field of the EHT MU PPDU includes 5-bit punctured channel information, but the EHT TB PPDU does not include punctured channel information. This is because it is assumed that the EHT TB PPDU is constructed according to resource allocation indicated by the trigger frame or TRS control information, so the STA does not need to inform the AP of the resource information of the EHT TB PPDU.

In addition, even if the trigger frame or TRS control information as described above is received, the STA may not respond with the HE TB PPDU. For example, if, in the non-AP STA, a common information field included in the trigger frame or one or more subfields of an user field addressed to the non-AP STA or selected by the non-AP STA are not recognized, supported, or have an unsatisfied value, the corresponding non-AP STA may choose not to respond to the trigger frame. Similarly, if, in the non-AP STA, a TRS control subfield included in a frame addressed to the non-AP STA is not recognized by the non-AP STA, is not supported, or has an unsatisfied value, the corresponding non-AP STA may choose not to respond to the TRS control subfield.

Target Wake Time (TWT)

TWT is a PS (Power Saving) technology that can improve the energy efficiency of non-AP STAs by defining the service period (SP) between AP and non-AP STAs and sharing information about SPs to reduce medium contention.

An STA that performs a request/suggest/demand, etc. in the TWT setup stage may be referred to as a TWT requesting STA. Additionally, the AP that responds, such as Accept/Reject, to the request may be referred to as a TWT responding STA.

The setup step may include the process of determining/defining the STA's TWT request to the AP, the type of TWT operation performed, and the type of frame to be transmitted and received. TWT operation can be divided into individual TWT and broadcast TWT.

Figure 14:
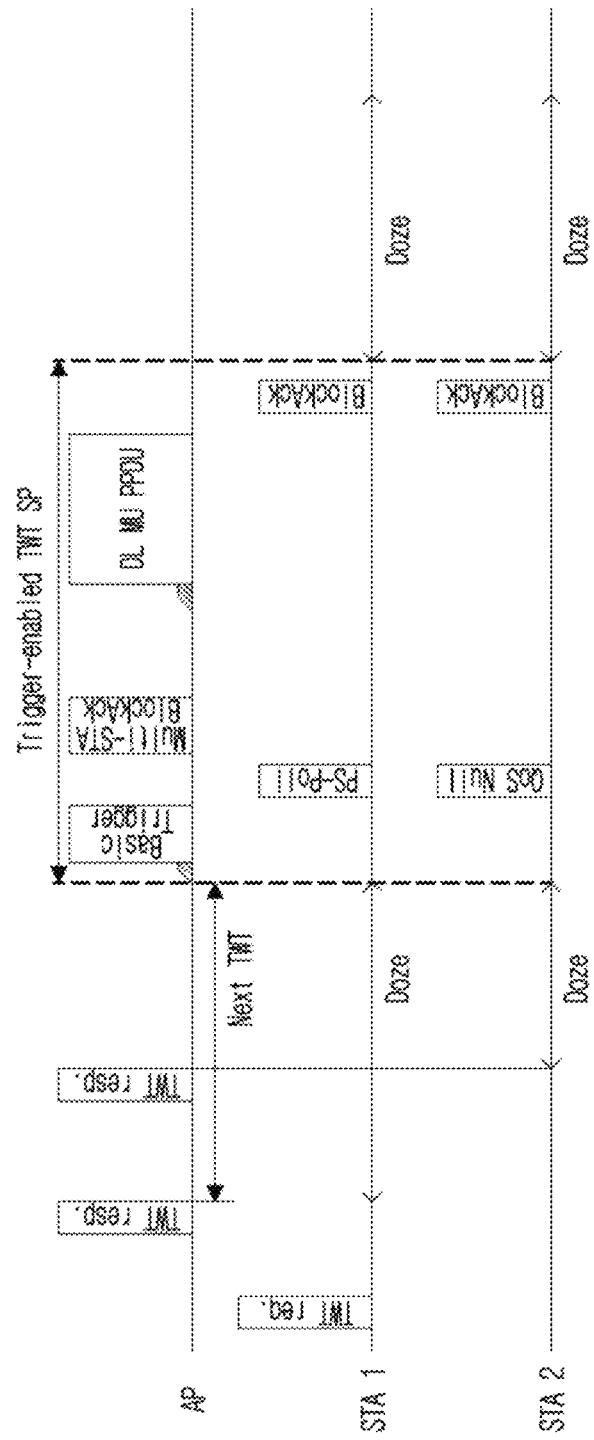
FIG. 14 is a diagram for describing an example of an individual TWT operation to which the present disclosure may be applied.

FIG. 14 is a diagram for describing an example of an individual TWT operation to which the present disclosure may be applied.

Individual TWT is a mechanism in which an AP and a non-AP STA negotiate the awake/doze state of the non-AP STA through transmission and reception of TWT request/response frames, and then exchange data.

In the example of FIG. 14, AP and STA 1 may form a trigger-enabled TWT agreement through a TWT request frame and a TWT response frame.

Here, the method used by STA 1 is a solicited TWT method. When STA 1 transmits a TWT request frame to the AP, STA 1 receives information for TWT operation from the AP through a TWT response frame.

On the other hand, STA 2, which performs the unsolicited TWT method, may receive information about trigger-enabled TWT agreement configurations from the AP through an unsolicited TWT response.

Specifically, STA 2 may calculate the next TWT by adding a specific number from the current TWT value. During a trigger-enabled TWT SP, the AP may transmit a trigger frame to STAs. The trigger frame may inform STAs that the AP has buffered data. In response to this, STA 1 may inform the AP of its awake state by transmitting a PS-Poll frame. Additionally, STA 2 may notify the AP of its awake state by transmitting a QoS Null frame. Here, the data frames transmitted by STA 1 and STA 2 may be frames in TB PPDU format. The AP that has confirmed the state of STA 1 and STA 2 may transmit a DL MU PPDU to the awake STAs. When the corresponding TWT SP expires, STA 1 and STA 2 may switch to the doze state.

Figure 15:
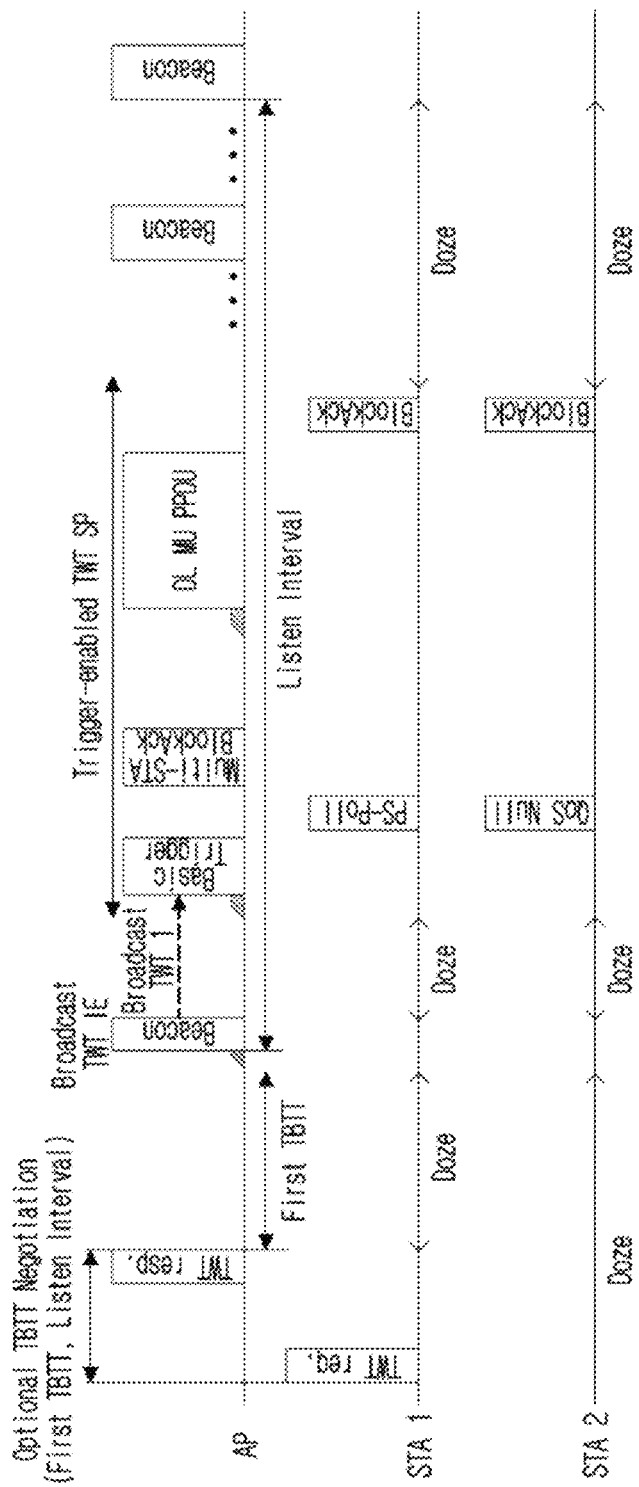
FIG. 15 is a diagram for describing an example of a broadcast TWT operation to which the present disclosure may be applied.

FIG. 15 is a diagram for describing an example of a broadcast TWT operation to which the present disclosure may be applied.

Broadcast TWT is a type of TWT in which a non-AP STA (or TWT scheduling STA) acquires information about target beacon transmission time (TBTT) and listening interval by transmitting and receiving TWT request/response frames with the AP (or TWT scheduled STA). Here, a negotiation operation for TBTT may be performed. Based on this, the AP may define a frame that will contain TWT scheduling information through a beacon frame.

In FIG. 15, STA 1 performs a solicited TWT operation, and STA 2 performs an unsolicited TWT operation. The AP may transmit the DL MU PPDU after checking the awake state of the STAs through the trigger transmitted by the AP. This may be the same as the process for individual TWT. In broadcast TWT, the trigger-enabled TWT SP, including the beacon frame, may be repeated several times at regular intervals.

Transmission of TWT information may be accomplished through a TWT information frame and a TWT information element. The TWT information frame is transmitted by an STA to request or convey information about the TWT agreement, and is transmitted by one of the STAs in the existing TWT agreement. The action field of the TWT Information frame includes a TWT information field. The TWT Information field may include a 3-bit TWT flow identifier subfield, a 1-bit response requested subfield, a 1-bit next TWT request subfield, a 2-bit next TWT subfield size subfield, 1-bit all TWT subfield, and 0/32/48/64-bit next TWT subfield.

Figure 16:
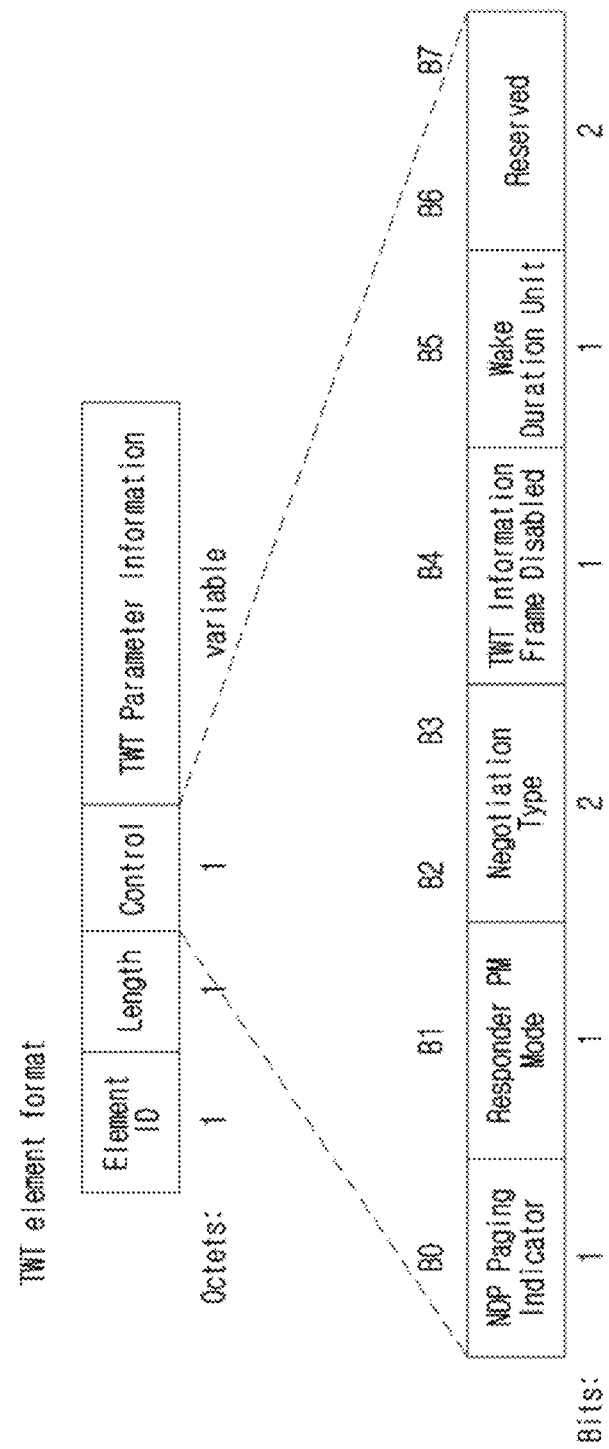
FIG. 16 is a diagram for describing an example of the TWT information element format.

FIG. 16 is a diagram for describing an example of the TWT information element format.

TWT elements may be transmitted and received by being included in beacons, probe responses, (re)combined response frames, etc. The TWT element may include an element ID field, a length field, a control field, and a TWT parameter information field.

The control field of the TWT element has the same format regardless of individual TWT and broadcast TWT.

The NDP paging indication subfield may have a value of 1 if the NDP paging field exists, and may have a value of 0 if the NDP paging field does not exist.

The responder PM mode subfield may indicate a power management (PM) mode.

The negotiation type subfield may indicate whether the information included in the TWT element is about negotiation of parameters of broadcast TWT or individual TWT(s), or about wake TBTT interval.

For example, if the value of the negotiation type subfield is 0, the TWT subfield is for the future individual TWT SP start time, and the TWT element contains one individual TWT parameter set. This may correspond to individual TWT negotiation between the TWT requesting STA and the TWT responding STA, or to individual TWT announcement by the TWT responder.

For example, if the value of the negotiation type subfield is 1, the TWT subfield is for the next TBTT time, and the TWT element contains one individual TWT parameter set. This may correspond to wake TBTT and wake interval negotiation between a TWT scheduled STA and a TWT scheduled AP.

For example, if the value of the negotiation type subfield is 2, the TWT subfield is for the future broadcast TWT SP start time, and the TWT element includes one or more broadcast TWT parameter sets. This may correspond to providing a broadcast TWT schedule to the TWT scheduled STA by including a TWT element in the broadcast management frame transmitted by the TWT scheduling AP.

For example, if the value of the negotiation type subfield is 3, the TWT subfield is for the future broadcast TWT SP start time, and the TWT element includes one or more broadcast TWT parameter sets. This may correspond to managing membership in the broadcast TWT schedule by including a TWT element in an individually addressed management frame transmitted by either a TWT-scheduled STA or a TWT-scheduled AP.

If the TWT information frame disabled subfield is set to 1, it indicates that reception of the TWT information frame by the STA is disabled; otherwise, it may be set to 0.

The wake duration unit subfield indicates the unit of the nominal minimum TWT wake duration field. The wake duration unit subfield may be set to 0 when the unit is 256 us, and may be set to 1 when the unit is TU. If it is not a HE/EHT STA, the wake duration unit subfield may be set to 0.

The most significant bit (MSB) of the negotiation type field may correspond to the broadcast field. If the broadcast field is 1, one or more broadcast TWT parameter sets may be included in the TWT element. If the broadcast field is 0, only one individual TWT parameter set can be included in the TWT element. A TWT element with the broadcast field set to 1 may be referred to as a broadcast TWT element.

Also, FIG. 16 shows a case where the reserved field consists of 2 bits, but this is only an example. For example, the TWT element may include a Link ID bitmap present field (e.g., 1 bit) and a reserved field (e.g., 1 bit).

For example, if the link ID bitmap presence field is set to 1, the link ID bitmap subfield is set to exist in the individual TWT parameter set field format to be described later, and if the link ID bitmap presence field is set to 0, the link ID bitmap subfield may be set not to exist in the individual TWT parameter set field format.

Figure 17:
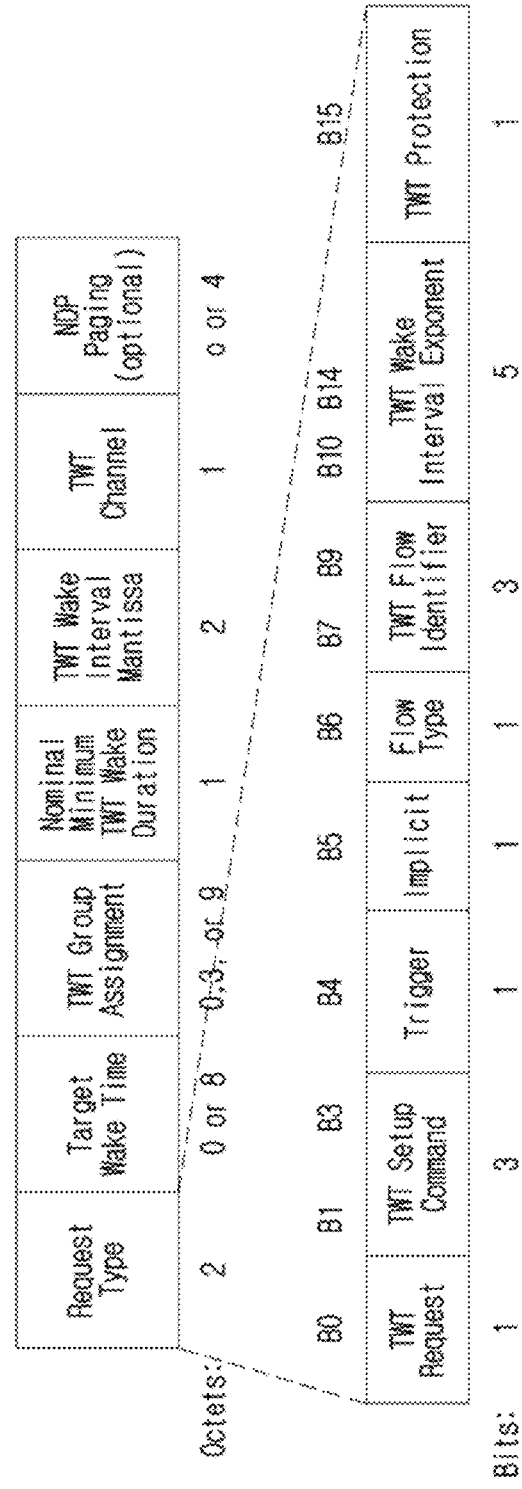
FIG. 17 is a diagram for describing examples of individual TWT parameter set field formats.
Figure 18:
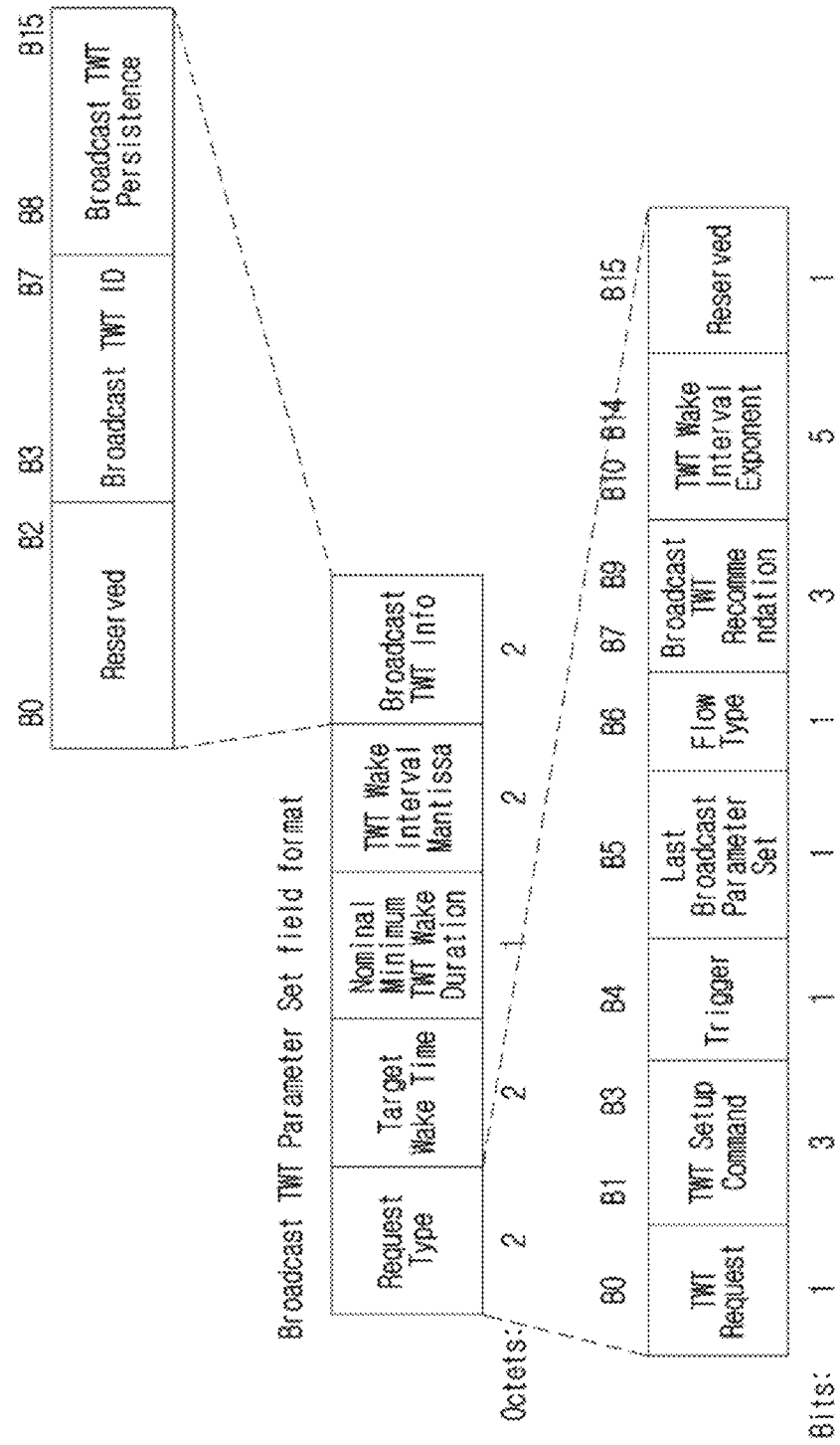
FIG. 18 is a diagram for describing examples of the broadcast TWT parameter set field format.

FIG. 17 is a diagram for describing examples of individual TWT parameter set field formats. FIG. 18 is a diagram for describing examples of the broadcast TWT parameter set field format.

The TWT parameter information field included in the TWT element of FIG. 16 may have a different configuration depending on individual TWT or broadcast TWT.

In the case of an individual TWT, the TWT parameter information field within the TWT element includes a single individual TWT parameter set field.

In the case of broadcast TWT, the TWT parameter information field in the TWT element includes one or more broadcast TWT parameter set fields. Each broadcast TWT parameter set may include specific information about one broadcast TWT.

As shown in FIGS. 17 and 18, the individual TWT parameter set field and the broadcast TWT parameter set field include common subfields.

The request type subfield has the same size in the individual TWT parameter set field and the broadcast TWT parameter set field, but the detailed configuration may be configured differently. This will be described later.

The target wake time subfield indicates the start time of the individual/broadcast TWT SP scheduled in the future.

The nominal maximum TWT wake duration subfield indicates the minimum unit that the TWT requesting STA is expected to wake up to complete the frame exchange associated with the TWT flow identifier during the TWT wake interval duration. Here, the TWT wake interval may mean the average time between consecutive TWT SPs expected by the TWT requesting STA.

The TWT Wake Interval Mantissa subfield is the binary value of the TWT wake interval value, which can be expressed in microseconds.

Referring to FIG. 17, the TWT group assignment subfield, TWT channel, and NDP paging subfield are included only in the individual TWT parameter set field.

The TWT group allocation subfield includes information about the TWT group to which the STA is assigned and provides it to the TWT requesting STA. The TWT value within the TWT group may be calculated using the corresponding information. The TWT value of the STA may be equal to the value of the zero offset and the value of the TWT unit multiplied by the value of the TWT offset.

The TWT channel subfield represents a bitmap indicating allowed channels. When transmitted by a TWT requesting STA, the TWT channel subfield may include a bitmap indicating the channel that the STA requests to use as a temporary basic channel during the TWT SP. When transmitted by the TWT response STA, the TWT channel subfield may include a bitmap indicating the channel on which the TWT request is allowed.

The NDP paging subfield is optional and may include the identifier of the STA being paged, information related to the maximum number of TWT wake intervals between NDP paging frames, etc.

Referring to FIG. 18, the broadcast TWT information (broadcast TWT info) subfield is included only in the broadcast TWT parameter set field. The broadcast TWT information subfield may include a 3-bit reservation bit, a 5-bit broadcast TWT identifier (ID) subfield, and an 8-bit broadcast TWT persistence subfield. The broadcast TWT identifier subfield indicates the broadcast ID of a specific broadcast TWT in which the STA requests participation or provides TWT parameters, depending on the value of the TWT setup command subfield of the TWT element. The broadcast TWT persistence subfield indicates the number of TBTTs planned on the schedule of the broadcast TWT.

Next, the detailed configuration of the request type subfield will be described.

First, referring to FIG. 17, the format of the request type subfield of the individual TWT parameter set field will be described.

The TWT request subfield may indicate whether it is a requesting STA or a responding STA. If the value is 1, it may indicate that it is a TWT requesting STA or a scheduling STA, and if the value is 0, it may indicate that it is a TWT responding STA or a scheduling AP.

The TWT setup command subfield may indicate commands such as Request, Suggest, Demand, Accept, Alternate, Dictate, Reject.

The trigger subfield indicates whether to use a trigger frame in TWT SP. If the value is 1, the trigger may be used, and if the value is 0, the trigger may not be used.

The implicit subfield may indicate whether it is an implicit TWT or an explicit TWT. If the value is 1, it may indicate implicit TWT, and if it is 0, it may indicate explicit TWT.

The flow type subfield may indicate the interaction type between the TWT requesting STA (or TWT scheduling STA) and the TWT responding STA (or TWT scheduling AP). If the value is 1, it may mean an announced TWT in which the STA sends a wakeup signal to the AP by transmitting a PS-Poll or APSD (automatic power save delivery) trigger frame before a frame other than a trigger frame is transmitted from the AP to the STA. If the value is 0, it may mean an unannounced TWT.

The TWT flow identifier subfield may include a 3-bit value that uniquely identifies specific information for the TWT request in other requests made between the same TWT request STA and TWT response STA pair.

The TWT wake interval exponent subfield may set the TWT wake interval value in binary microsecond units. In the case of individual TWT, this may mean the gap between individual TWT SPs. The TWT wake interval of the requesting STA may be defined as [TWT Wake Interval Mantissa*2*TWT Wake Interval Exponent].

The TWT protection subfield may indicate whether to use the TWT protection mechanism. If the value is 1, TXOP in the TWT SP may be initiated with a NAV protection mechanism such as (MU)RTS/CTS or CTS-to-self frame, and if the value is 0, the NAV protection mechanism may not be applied.

Referring to FIG. 18, some of the subfields of the request type subfield of the broadcast TWT parameter set field are common with the subfields of the request type subfield of the individual TWT parameter set field, so description thereof is omitted. Subfields included only in the broadcast TWT parameter set are described below.

The Last Broadcast Parameter Set subfield indicates whether it is the last broadcast TWT parameter set. If the value is 1, it may indicate that it is the last broadcast TWT parameter set, and if the value is 0, it may indicate that the next broadcast TWT parameter set exists.

The broadcast TWT recommendation subfield may indicate recommendations for the frame type transmitted by the AP during the broadcast TWT SP with a value of 1-7.

The last 1 bit of the request type subfield of the broadcast TWT parameter set field may be reserved.

Hereinafter, a low-latency transmission method according to the present disclosure to support latency-sensitive traffic will be described.

As wired/wireless traffic has recently exploded, traffic sensitive to latency has also increased significantly. Traffic sensitive to latency includes real-time audio/video transmission, and with the proliferation of multimedia devices, the need to support this in a wireless environment has increased. However, compared to a wired environment, there are many things to consider in a wireless environment to support latency-sensitive traffic. This is because the transmission speed in a wireless environment is lower than that in a wired environment, and interference issues from the surroundings must also be considered. In particular, in a wireless LAN system, multiple STAs must compete equally for medium occupancy in the ISM (Industry-Science-Medical) band, so it is relatively more difficult to support latency-sensitive traffic compared to a cellular communication network based on radio resource scheduling by a central base station. This disclosure describes a new method for supporting latency-sensitive traffic in a wireless LAN system.

In the present disclosure, latency may mean latency defined in the IEEE 802.11 series standard. For example, latency may mean the time from when a frame to be transmitted is entered into the queue of transmitting STA's MAC layer, until the transmission of the transmitting STA in PHY layer is successfully completed, until transmitting STA receives transmitting STA from receiving STA and the frame is deleted from transmitting STA's MAC layer queue.

Additionally, in the present disclosure, a non-AP STA that supports transmission of latency sensitive data may be referred to as a low latency STA. And, data other than latency-sensitive data may be referred to as regular data.

Figure 19:
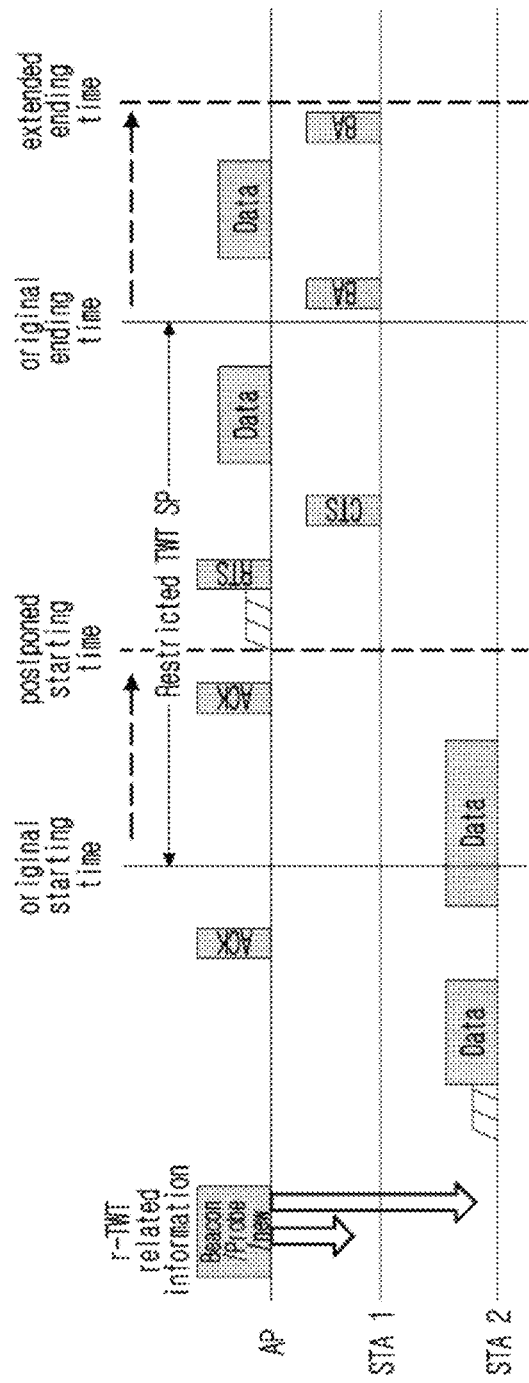
FIG. 19 is a diagram for describing a restricted TWT operation of an STA according to an example of the present disclosure.

Hereinafter, restricted TWT will be described with reference to FIG. 19.

The restricted TWT (r-TWT) may support obtaining the possibility of data transmission for low-latency STAs preferentially compared to other STAs by allowing the AP to set a special broadcast TWT for low-latency STAs transmitting latency-sensitive data. The STA may establish membership for one or more r-TWT schedules for the AP.

Here, the r-TWT agreement may be established by the same process as the broadcast TWT agreement, and the broadcast TWT element for this may be defined to include the r-TWT parameter set field. For example, the r-TWT parameter set may refer to a specific broadcast TWT parameter set field that is distinct from other broadcast TWT parameter set fields. That is, the r-TWT parameter set field may correspond to a special case of the broadcast TWT parameter set field. Additionally, the AP may announce the r-TWT SP.

As described above in the present disclosure, a non-AP STA that supports transmission of latency-sensitive data may be referred to as a low-latency STA, and data that is not latency-sensitive data may be referred to as regular data.

Additionally or alternatively, a low latency STA related to a specific r-TWT is referred to as a member r-TWT scheduled STA, and other STAs are referred to as non-member STAs. A non-member STA may be an STA that has the capability to support r-TWT operation but is not a member of any r-TWT, an STA that does not have the capability to support r-TWT operation, or a member of another r-TWT while supporting r-TWT operation.

An STA (e.g., a low-latency STA) that supports limited SP (or r-TWT SP) operation of broadcast TWT may inform the AP that latency-sensitive data should be transmitted based on r-TWT operation. If the AP supports r-TWT operation/mode, the AP may transmit a frame including scheduling information of the TWTs requested by each STA to the low-latency STA and other STA(s). For example, to perform operations on r-TWT, non-AP STAs may obtain r-TWT related information from the AP through a beacon frame, probe response frame, (re)assembly response frame, or other frame in an undefined format (e.g., frames for broadcast, advertising, and notice purposes).

According to r-TWT operation, a separate TXOP (i.e., access of other STAs is restricted) may be secured (or executed) within the r-TWT SP using (MU) NAV such as RTS/CTS or CTS-to-self, or silent interval, etc. Before a specific r-TWT SP starts, if there is a TXOP of an STA other than the STA having membership for the specific r-TWT schedule (i.e., a non-member STA), it must be stopped. And the TXOP of the other STA (i.e., non-member STA) may be additionally performed after the specific r-TWT SP ends. This may be referred to as a TXOP rule-based operation for the r-TWT SP of a non-member STA. Through this TXOP rule of r-TWT, a more predictable low-delay service may be provided for latency-sensitive data.

Conditional Operation Method of r-TWT

According to the TXOP rules of r-TWT described above, EHT non-APs that support announced r-TWT SPs and are associated with an AP that announced the r-TWT SP must complete their TXOP before the start of the r-TWT SP.

The present disclosure describes the execution conditions added to the TXOP rule of the r-TWT SP described above. Through this, the predictable low-delay service aimed at by the TXOP rule of the r-TWT SP described above may be provided, and the efficiency of delay-sensitive data/traffic transmission can be increased in a way that does not prevent existing data transmission and reception flows.

Figure 20:
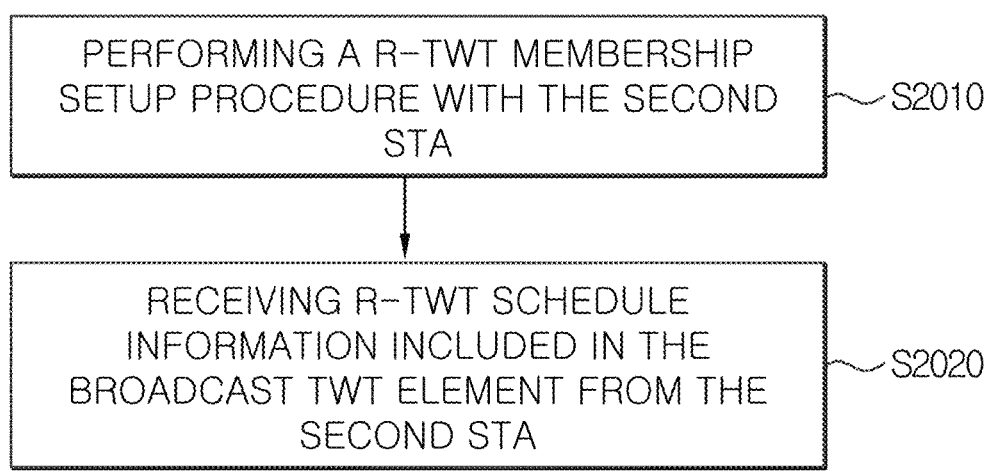
FIG. 20 is a diagram for describing the restricted TWT operation of the first STA according to an example of the present disclosure.
Figure 21:
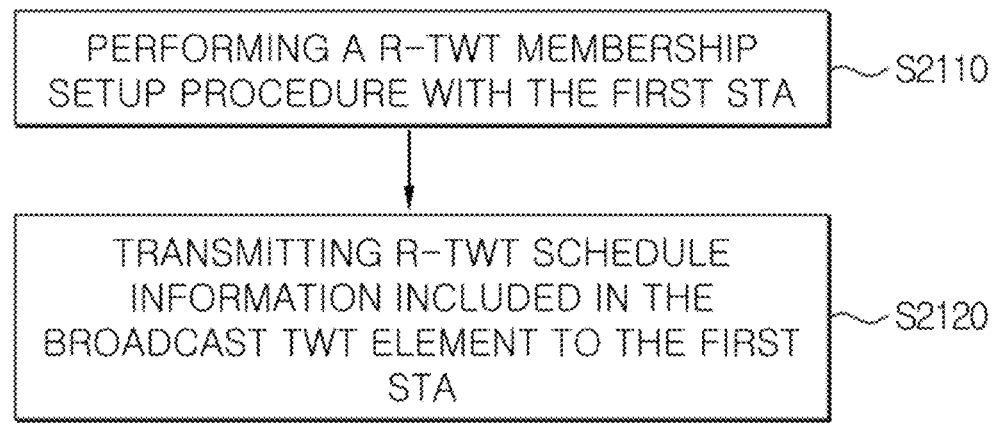
FIG. 21 is a diagram for describing the restricted TWT operation of a second STA according to an example of the present disclosure.

FIG. 20 is a diagram for describing the restricted TWT operation of the first STA according to an example of the present disclosure. In FIG. 20 and FIG. 21, the first STA may be an EHT non-AP STA (coupled to an AP) and the second STA may be an AP, but are not limited thereto.

The first STA may perform a restricted target wake time (r-TWT) membership setup procedure with the second STA (S2010).

The r-TWT membership setup procedure may be established in the same way as the broadcast TWT membership procedure. However, in the case of the r-TWT membership setup procedure, the broadcast TWT element transmitted on the TWT setup frame may include one or more r-TWT parameter set fields.

The second STA (e.g., r-TWT scheduling AP) and the first STA (e.g., R-TWT scheduled STA) may set the r-TWT traffic information field to identify the TID(s) carrying delay-sensitive traffic in the DL and UL for the established r-TWT membership. That is, at least one r-TWT DL TID or at least one r-TWT UL TID may be set by the first STA and the second STA.

TID(s) indicated as delay sensitive traffic in DL and UL in the r-TWT traffic information field may be collectively referred to as r-TWT TID. TID(s) indicated as delay-sensitive traffic in the DL and UL in the r-TWT traffic information field may be within the TID set mapped to the DL and UL, respectively.

Hereinafter, the TID specified in the r-TWT traffic information field of the TWT element of the TWT response frame indicating Accept TWT will be referred to as R-TWT DL TID(s) or R-TWT UL TID(s).

The first STA may receive r-TWT schedule information included in the broadcast TWT element from the second STA (S2020).

Specifically, if there is an established r-TWT membership, the second STA may announce r-TWT schedule information by including an r-TWT parameter set field in the broadcast TWT element included in the transmitted management frame.

As an example, the first information may receive r-TWT schedule information through a beacon frame and/or probe response frame.

As an example of the present disclosure, based on a specific portion (or part) of the first TXOP in the r-TWT SP announced by r-TWT schedule information being not used to deliver a DL frame corresponding to at least one r-TWT DL TID or to solicit a UL frame corresponding to at least one r-TWT uplink (UL) TID, the first TXOP may end before the start time of r-TWT SP.

Specifically, when the second STA that announces the r-TWT SP is the holder of the first TXOP, if a specific portion of the first TXOP is not used to deliver a DL frame corresponding to at least one r-TWT DL TID or to solicit a UL frame corresponding to at least one r-TWT UL TID, the second STA may ensure that the first TXOP ends before the start time of the r-TWT SP.

That is, if a specific portion of the first TXOP is not used for transmitting and receiving frames corresponding to at least one r-TWT DL TID or at least one r-TWT UL TID, the second STA may ensure that the first TXOP ends before the start time of the r-TWT SP.

As another example, based on a specific portion of the first TXOP being used to deliver a DL frame corresponding to at least one r-TWT DL TID or to solicit a UL frame corresponding to at least one r-TWT UL TID, the first TXOP may not end even after the start time of the r-TWT SP.

Based on the first TXOP not ending after the start time of the r-TWT SP, the end time of the r-TWT SP may be postponed. For example, as the first TXOP does not end after the start time of the r-TWT SP, the end time of the r-TWT SP may be postponed by the time of the delayed r-TWT SP.

Additionally or alternatively, the maximum time for which the end time of the r-TWT SP can be delayed may be set/indicated/defined by the (start) time value of the delayed r-TWT SP.

As an another example of the present disclosure, based on the first STA being the holder of the second TXOP, the second TXOP may end before the start of the r-TWP SP announced by the second STA. That is, the first STA may ensure that the second TXOP ends before the start time of the r-TWT SP announced by the second STA.

FIG. 21 is a diagram for describing restricted TWT operation of a second STA according to an example of the present disclosure.

The second STA may perform a restricted target wake time (r-TWT) membership setup procedure with the first STA (S2110).

As an example, the second STA may set the trigger field value to 1 in the transmitted r-TWT parameter set field.

The second STA may transmit r-TWT schedule information included in the broadcast TWT element to the first STA (S2120).

Specifically, if there is an established r-TWT membership, the second STA may announce r-TWT schedule information by including an r-TWT parameter set field in the broadcast TWT element.

Since operations and parameters related to S2110 and S2120 may correspond to operations and parameters related to S2010 and S2020, overlapping descriptions will be omitted.

Hereinafter, the conditional execution method of r-TWT according to the present disclosure will be described in detail. That is, the conditional TXOP rule of the r-TWT TWT SP, which reflects additional conditions to the TXOP rule of the r-TWT SP described above, will be described. One or more STAs may perform an operation according to one or more of the embodiments described later.

Embodiment 1

Embodiment 1 relates to a method of executing the conditional TXOP rule of r-TWT SP according to data priority.

A rule may be defined in which an EHT non-AP STA that supports r-TWT SPs announced from the AP and is associated with the AP that announced the r-TWT SP must end its TXOP before the start of the corresponding r-TWT SP. However, the rule may be executed/applied only when the data transmitted by the corresponding STA (e.g., the EHT non-AP STA or/and AP) during the corresponding TXOP is not data that must be transmitted more urgently than delay-sensitive data.

That is, if the data transmitted by the corresponding STA (e.g., the EHT non-AP STA or/and AP) during the corresponding TXOP is data that must be transmitted more urgently than delay-sensitive data, the above rule may be applied/executed.

Specifically, the rule may be applied/executed only when a specific condition is satisfied, and the specific condition may be set/defined as one of the options described later.

Option 1

If the data transmitted during TXOP is not data for one of the TIDs classified as latency traffic, the above-described TXOP rule may be applied/executed.

That is, if the data transmitted during TXOP is not data for one of the TIDs classified as delayed traffic, the corresponding STA (e.g., the EHT non-AP STA or/and AP) may terminate the corresponding TXOP when the r-TWT SP starts.

And, if the data transmitted during TXOP is data for one of the TIDs classified as delayed traffic, the STA (e.g., the EHT non-AP STA or/and AP) may continue to transmit the data without ending the TXOP (even after the start time of the r-TWT SP).

Option 2

If the data transmitted during TXOP is traffic that has a lower priority than the delay traffic specified in the r-TWT SP (i.e., the data transmitted during TXOP is not data that must be transmitted more urgently than delay-sensitive data), the TXOP rules described above may be applied/implemented.

That is, if the data transmitted during TXOP is traffic with lower priority than the delay traffic specified in the r-TWT SP, the corresponding STA (e.g., the EHT non-AP STA or/and AP) may terminate the corresponding TXOP when the r-TWT SP starts.

And, if the data transmitted during TXOP has a higher priority or is traffic with the same priority as the delay traffic specified in the r-TWT SP, the STA (e.g., the EHT non-AP STA or/and AP) may continue to transmit the data without ending the TXOP (even after the start time of the r-TWT SP).

Option 3

If the data transmitted during TXOP belongs to a specific AC, the above-described TXOP rules may be applied/executed.

That is, if the data transmitted during TXOP is a specific AC, the corresponding STA (e.g., the EHT non-AP STA or/and AP) may terminate the corresponding TXOP when the r-TWT SP starts. And, if the data transmitted during TXOP is an AC other than a specific AC (for example, AC_VO or AC_VI), the STA (e.g., the EHT non-AP STA or/and AP) may continue to transmit the data without ending the TXOP (even after the start time of the r-TWT SP).

Here, the specific AC may be AC_BE or AC_BK, but is not limited thereto. For example, even if the data transmitted during TXOP is AC_VI, the above-described TXOP rules may be applied/executed.

Embodiment 2

Embodiment 2 relates to a method of executing the conditional TXOP rule of the r-TWT SP according to the importance of data transmitted and received by the STA that negotiated the r-TWT SP.

A TXOP rule may be defined so that an EHT non-AP STA that supports r-TWT SPs announced from the AP and is associated with the AP that announced the r-TWT SP ends its TXOP before the start of the r-TWT SP.

However, when setting up r-TWT, the corresponding TXOP rule may be applied/executed only if the data to be transmitted in the corresponding TXOP is not data indicated as delay-sensitive data/traffic by the UL/DL TID negotiated by the corresponding STA (e.g., EHT non-AP STA and/or AP).

That is, if the data to be transmitted to the corresponding TXOP is data indicated as delay-sensitive data/traffic by the UL/DL TID negotiated by the corresponding STA (e.g., EHT non-AP STA and/or AP), the STA may not terminate the TXOP even after the r-TWT SP starts.

Specifically, STAs that support r-TWT and have a broadcast TWT ID of the same value can receive information about the r-TWT SP from the AP. STAs performing r-TWT setup to be assigned an AP and r-TWT SP can negotiate delay-sensitive data/traffic through UL/DL TID.

Accordingly, the AP and the STAs assigned to the r-TWT SP may share TID information implying/indicating that it is delay-sensitive data/traffic during the corresponding r-TWT SP. According to the conditions described above, if the STA transmits data with a TID implied/indicated to be delay sensitive data/traffic (according to the scheduled r-TWT SP), the STA does not need to stop its TXOP before the r-TWT SP starts.

Figure 22:
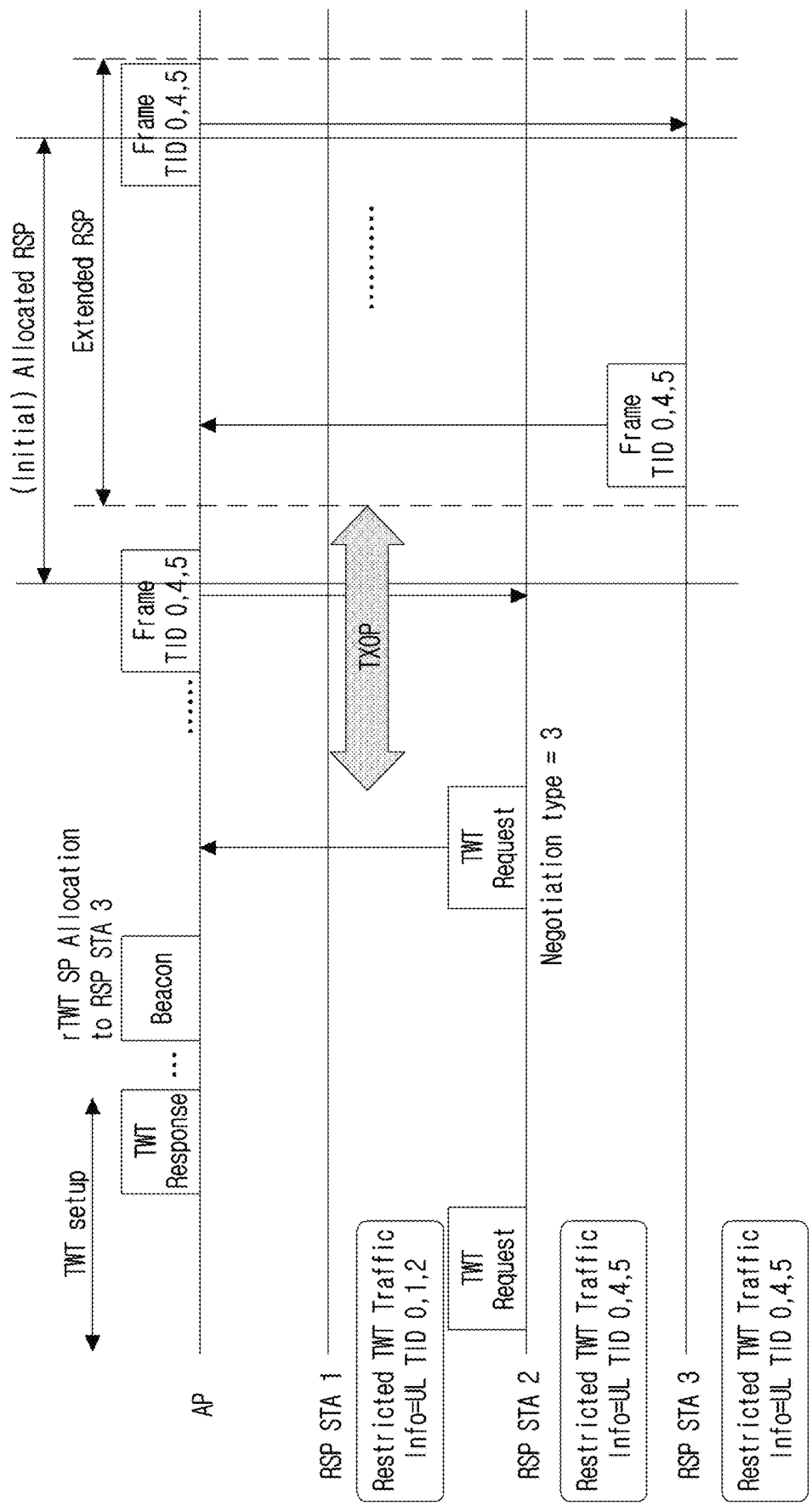
FIGS. 22, 23, 24, and 25 illustrate a process in which the conditional TXOP rule of r-TWT SP is applied according to an example of the present disclosure.
Figure 23:
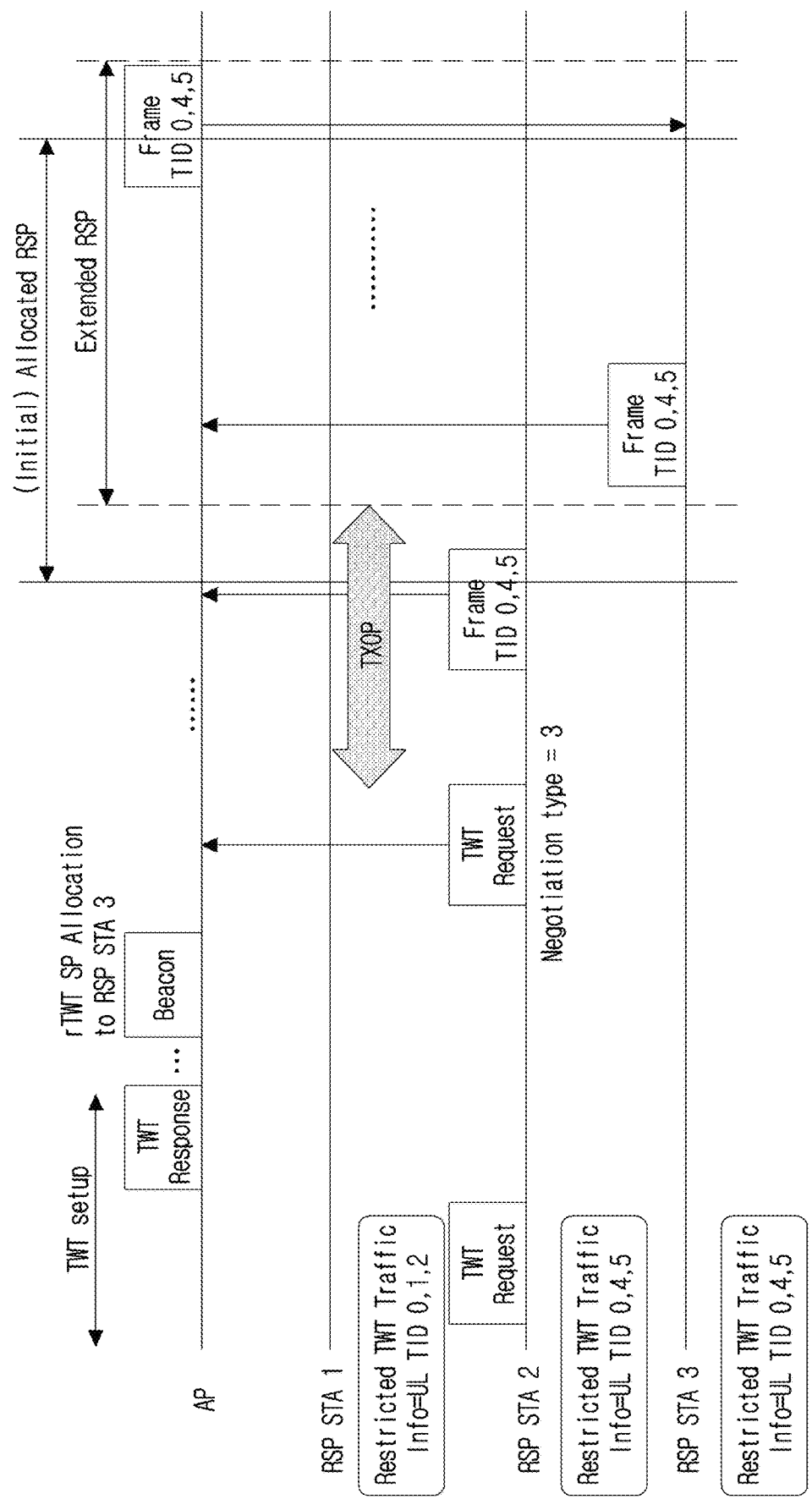

FIGS. 22 and 23 illustrate a process in which the conditional TXOP rule of r-TWT SP according to Embodiment 2 is applied.

RSP STA 1, RSP STA 2, and RSP STA 3, which are RSP STAs (STAs that support r-TWT SP), can all proceed with the TWT setup process. However, FIGS. 22 and 23 illustrate the process of RSP STA 2 performing the TWT setup procedure and the process of establishing membership with the AP and RSP STA 2.

That is, when the AP announces TWT information to one or more RSP STAs through a beacon frame, FIGS. 22 and 23 illustrate an operation in which the RSP STA, which has received the corresponding TWT information, sends a TWT request based on the broadcast TWT ID corresponding to the desired TWT.

Accordingly, RSP STA 1, RSP STA 2, and RSP STA 3 may all have the same broadcast TWT ID. RSP STA 1 may classify data corresponding to TIDs 0, 1, and 2 as delay-sensitive data/traffic. RSP STA 2 and RSP STA 3 can classify data corresponding to TIDs 0, 4, and 5 as delay-sensitive data/traffic.

If the beacon frame transmitted by the AP includes information on the r-TWT SP assigned to RSP STA 3, (DL/UL) data classified as delay-sensitive data/traffic in the r-TWT SP may be data whose TIDs correspond to 0, 4, and 5. If RSP STA 2 transmits data corresponding to TIDs 0, 4 and 5 before the start of the corresponding r-TWT SP, RSP STA 2 may complete data transmission and reception corresponding to TID 0, 4, and 5 without stopping its TXOP before the r-TWT SP.

Here, r-TWT SP may be extended by the time interval from the start of r-TWT SP to the time TXOP is completed. In other words, r-TWT SP may start from the time TXOP is completed, and the r-TWT SP may be extended by the above time period. Additionally or alternatively, the maximum time for which the end time of the r-TWT SP may be delayed may be set/indicated/defined by the (start) time value of the delayed r-TWT SP.

Embodiment 3

Embodiment 3 relates to a method of executing/applying the above-described TXOP rules conditionally according to the TXOP holder.

An EHT non-AP STA that supports r-TWT SPs announced from the AP and is associated with the AP that announced the r-TWT SP must finish its TXOP before the start of the r-TWT SP. However, when the EHT non-AP STA is an EHT non-AP STA that has been allocated an r-TWT SP notified by the AP, there is no need to stop/terminate its TXOP.

The existing TXOP rule of r-TWT defines the operation of unconditionally stopping TXOP in progress before r-TWT SP when r-TWT SP starts, and this is to safely complete the transmission and reception of delay-sensitive data/traffic within the r-TWT SP.

However, if the holder of the TXOP in progress before the r-TWT SP and the STA assigned to the r-TWT SP are the same, the STA does not need to stop its TXOP before the r-TWT SP starts. In other words, the STA can efficiently complete transmission and reception of delay-sensitive data/traffic within the r-TWT SP while maintaining its TXOP.

Figure 24:
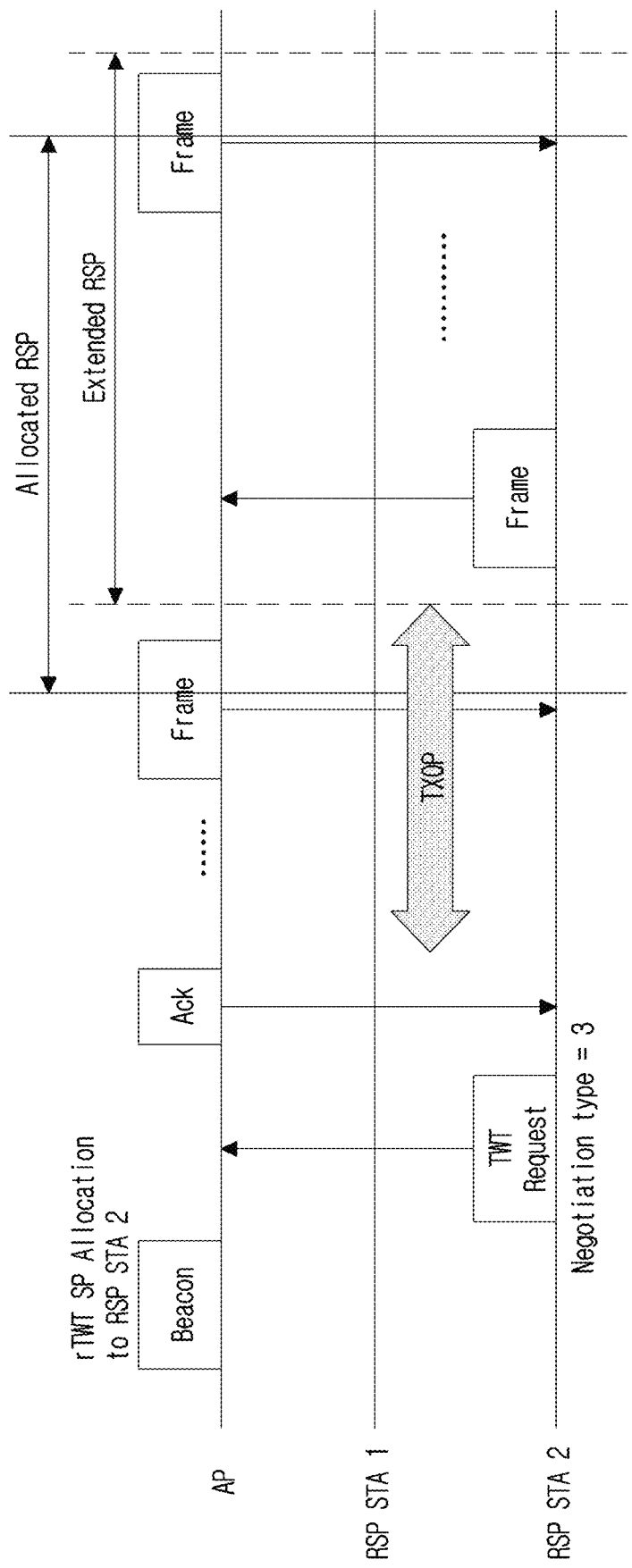
Figure 25:
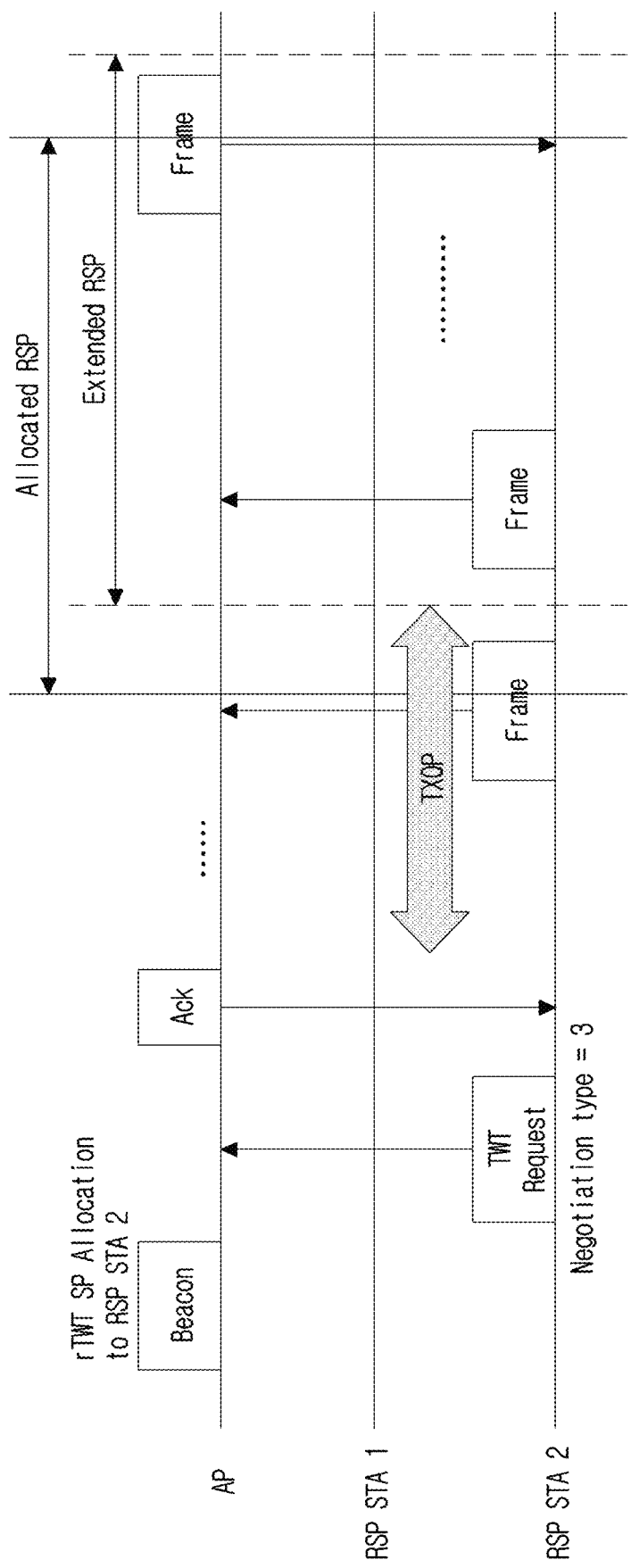

FIGS. 24 and 25 illustrate a process in which the conditional TXOP rule of r-TWT SP according to Embodiment 3 is applied.

FIGS. 24 and 25 illustrate the membership process between AP and RSP STA 2. When the AP announces TWT information through a beacon frame, the STA that received the TWT information may transmit a TWT request to the AP based on the broadcast TWT ID corresponding to the desired TWT.

If the beacon frame transmitted by the AP includes information about the r-TWT SP (RSP) assigned to RSP STA 2, RSP STA 2 may correspond to a TXOP holder that transmits data during its TXOP before the scheduled r-TWT SP.

At this time, when the conditional TXOP rule according to Embodiment 3 is applied, since the scheduled r-TWT SP is the r-TWT SP allocated to RSP STA 2, RSP STA 2 may transmit and receive (UL/DL) delay-sensitive traffic within the r-TWT SP without stopping its TXOP.

Embodiment 4

At least one of Embodiment 1, Embodiment 2, or Embodiment 3 described above for the TXOP rule of r-TWT SP may be applied. Embodiment 4 relates to a method by which an AP can inform other STAs of the TXOP rule of the r-TWT SP to which the above-described embodiment(s) is applied.

In the case of an unsolicited method, the AP may inform other STAs of information related to the above-described embodiment(s) through a beacon frame, a (broadcast) probe response frame, or another (or/and new) announcement (or/and broadcast) frame.

Figure 27:
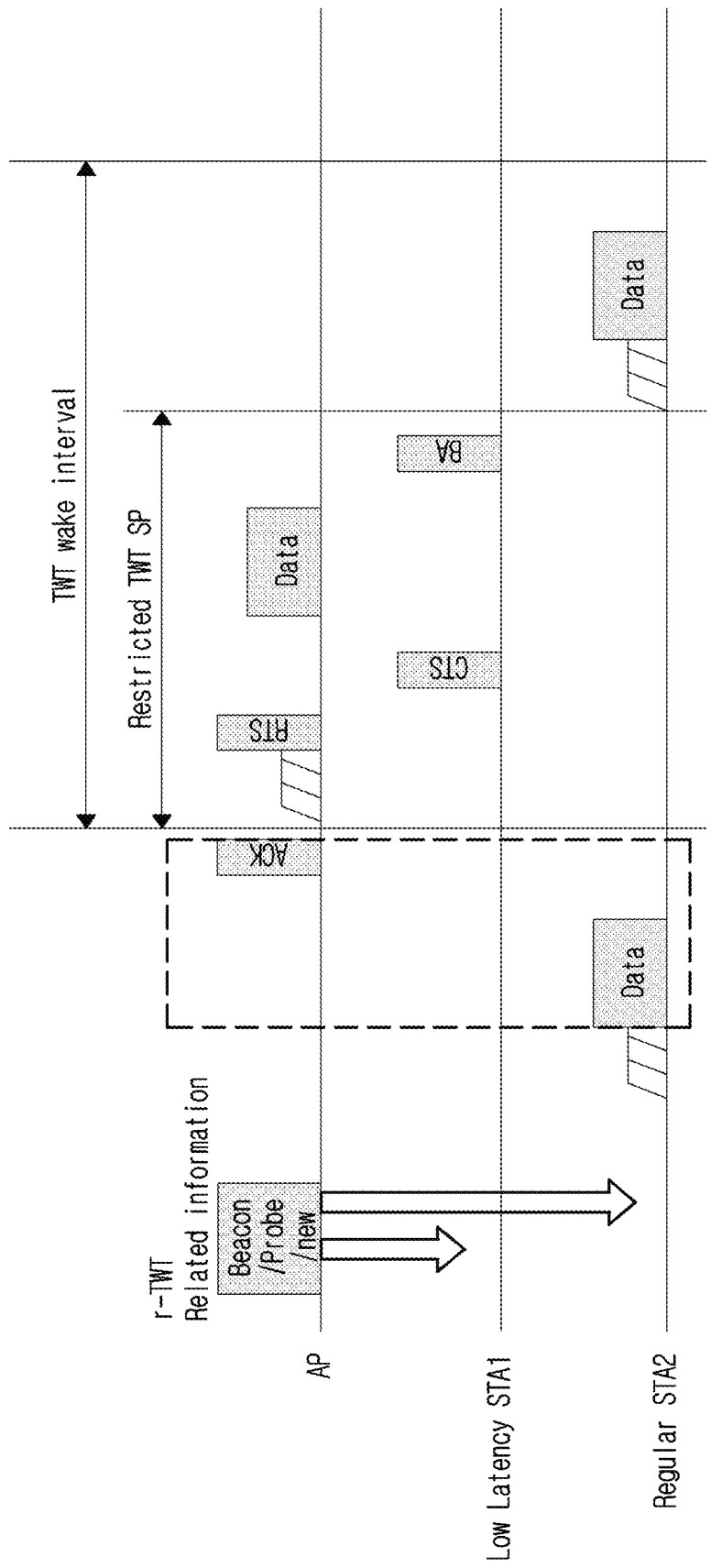

FIGS. 26 and 27 are diagrams illustrating a process by which an AP notifies other STAs of information related to the above-described embodiment(s).

Specifically, FIG. 26 is an example of r-TWT operation performance when regular data is more urgent than delay-sensitive data (or/and when regular data has higher priority than delay-sensitive data). FIG. 27 illustrates r-TWT operation when delay-sensitive data is more urgent than general data (or/and when delay-sensitive data has a higher priority than general data).

Figure 28:
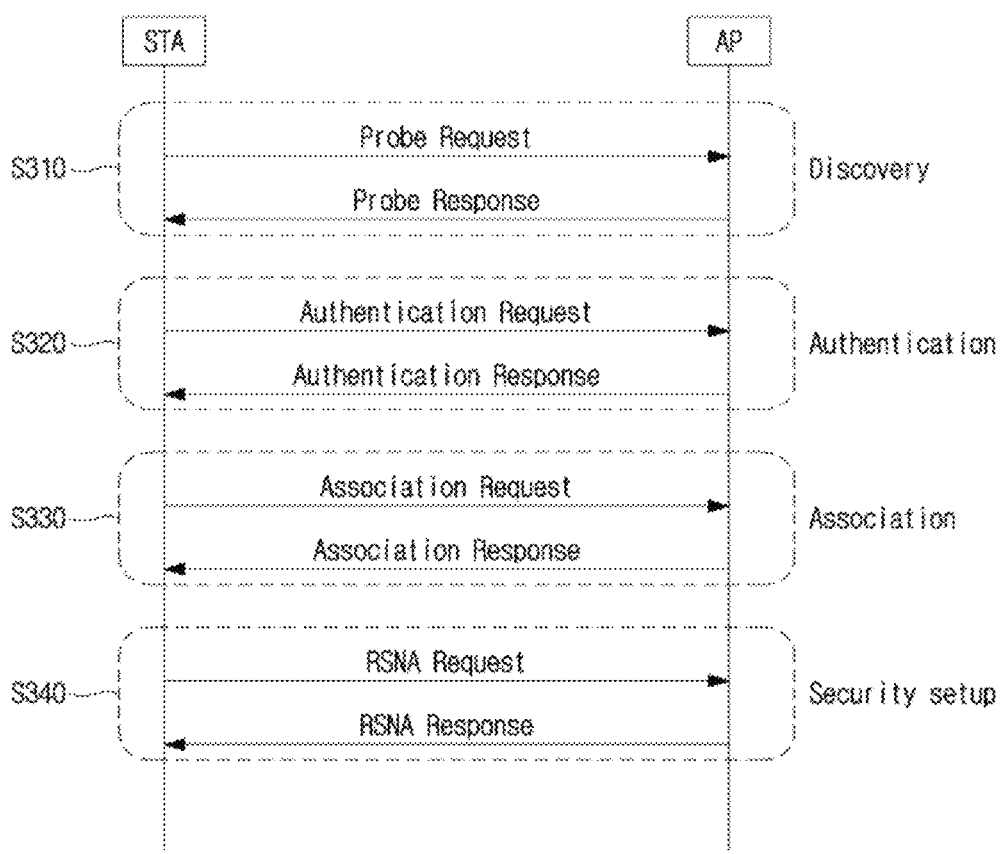

Additionally or alternatively, as shown in FIG. 28, the UE and the AP may exchange information related to the corresponding embodiment through a negotiation procedure (e.g., probe request procedure, probe response procedure, association request procedure, association response procedure, new Request procedure, and new response procedure, etc.). Here, the probe/association/new request/response procedure may mean a procedure for transmitting and receiving a probe/association/new request/response frame.

In the negotiation procedure, information related to delay traffic (e.g., Real-time gaming, Cloud gaming, Real-time video, Robotic and industrial automation, etc.), whether each AP/STA supports r-TWT SP, etc. may be exchanged.

Through this, the AP and low-latency STA(s) may set the optimal environment for delay-sensitive traffic to be transmitted. As an example, transmission and reception of the above-described information may be performed in at least one of the methods described later.

Method 1: AP and low-latency STA may exchange the above-described information through a one-time request and response procedure during the negotiation process.

Method 2: AP and low-latency STA may transmit the above-described information across (or divided into) i) probe request procedure and probe response procedure, and ii) association request procedure & combination response procedure.

Method 3: The above-described information may be exchanged through a separate new request procedure and new response procedure for transmitting information related to the low-latency STA.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

A method proposed by the present disclosure is mainly described based on an example applied to an IEEE 802.11-based system, 5G system, but may be applied to various WLAN or wireless communication systems other than the IEEE 802.11-based system.

What is claimed is:

1. A method performed by a non-access point (AP) station (STA) in a wireless LAN system, the method comprising:
   performing a restricted target wake time (r-TWT) membership setup procedure with an AP; and receiving r-TWT schedule information included in a broadcast TWT element from the AP, wherein based on the AP being a holder of a first transmission opportunity (TXOP) and a specific portion of the first TXOP within an r-TWT service period (SP) announced by the r-TWT schedule information being not used to deliver a downlink (DL) frame corresponding to at least one r-TWT DL traffic identifier (TID) or to solicit a uplink (UL) frame corresponding to at least one r-TWT UL TID, the first TXOP ends before a start time of the r-TWT SP, wherein based on the AP being the holder of the first TXOP and the specific portion of the first TXOP being used to deliver the DL frame corresponding to the at least one r-TWT DL TID or to solicit the UL frame corresponding to the at least one r-TWT UL TID, the first TXOP does not end after the start time of the r-TWT SP, and wherein based on the non-AP STA being a holder of a second TXOP, the second TXOP ends before the start time of the r-TWT SP.

2. The method of claim 1, wherein:
the at least one r-TWT DL TID or the at least one r-TWT UL TID is set by the non-AP STA and the AP.

3. The method of claim 1, wherein:
the r-TWT schedule information is received from the AP through a beacon frame or probe response frame.

4. The method of claim 1, wherein:
based on the first TXOP not ending after the start time of the r-TWT SP, an end time of the r-TWT SP is postponed.

5. A non-access point (AP) station (STA) for performing communication in a wireless LAN system, the non-AP STA comprising:
at least one transceiver; and
at least one processor connected to the at least one transceiver,
wherein the at least one processor is configured to:
perform a restricted target wake time (r-TWT) membership setup procedure with an AP; and
receive r-TWT schedule information included in a broadcast TWT element from the AP through the at least one transceiver,
wherein based on the AP being a holder of a first transmission opportunity (TXOP) and a specific portion of the first TXOP within an r-TWT service period (SP) announced by the r-TWT schedule information being not used to deliver a downlink (DL) frame corresponding to at least one r-TWT DL traffic identifier (TID) or to solicit a uplink (UL) frame corresponding to at least one r-TWT UL TID, the first TXOP ends before a start time of the r-TWT SP, wherein based on the AP being the holder of the first TXOP and the specific portion of the first TXOP being used to deliver the DL frame corresponding to the at least one r-TWT DL TID or to solicit the UL frame corresponding to the at least one r-TWT UL TID, the first TXOP does not end after the start time of the r-TWT SP, and wherein based on the non-AP STA being a holder of a second TXOP, the second TXOP ends before the start time of the r-TWT SP.

6. An access point (AP) in a wireless LAN system, the AP comprising:
at least one transceiver; and
at least one processor connected to the at least one transceiver,
wherein the at least one processor is configured to:
perform a restricted target wake time (r-TWT) membership setup procedure with a non-AP station (STA); and
transmit r-TWT schedule information included in a broadcast TWT element to the non-AP STA through the at least one transceiver,
wherein based on the AP being a holder of a first transmission opportunity (TXOP) and a specific portion of the first TXOP within an r-TWT service period (SP) announced by the r-TWT schedule information being not used to deliver a downlink (DL) frame corresponding to at least one r-TWT DL traffic identifier (TID) or to solicit a uplink (UL) frame corresponding to at least one r-TWT UL TID, the first TXOP ends before a start time of the r-TWT SP,
wherein based on the AP being the holder of the first TXOP and the specific portion of the first TXOP being used to deliver the DL frame corresponding to the at least one r-TWT DL TID or to solicit the UL frame corresponding to the at least one r-TWT UL TID, the first TXOP does not end after the start time of the r-TWT SP, and
wherein based on the non-AP STA being a holder of a second TXOP, the second TXOP ends before the start time of the r-TWT SP.

* * * * *